United States Patent
Herrmann et al.

(10) Patent No.: US 11,962,551 B1
(45) Date of Patent: Apr. 16, 2024

(54) AGGREGATING DATA RETRIEVED FROM COMMUNICATION CHANNELS

(71) Applicant: DMHJV001 Inc., Salt Lake City, UT (US)

(72) Inventors: Ava Grace Herrmann, Salt Lake City, UT (US); Alex Herrmann, Salt Lake City, UT (US)

(73) Assignee: DMHJV001 Inc., Salt Lake City, UT (US)

( * ) Notice: Subject to any disclaimer, the term of this patent is extended or adjusted under 35 U.S.C. 154(b) by 0 days.

(21) Appl. No.: 17/935,843

(22) Filed: Sep. 27, 2022

Related U.S. Application Data

(60) Provisional application No. 63/364,416, filed on May 9, 2022.

(51) Int. Cl.
*H04L 51/07* (2022.01)

(52) U.S. Cl.
CPC .................. *H04L 51/07* (2022.05)

(58) Field of Classification Search
None
See application file for complete search history.

(56) References Cited

U.S. PATENT DOCUMENTS

| | | | | |
|---|---|---|---|---|
| 8,694,588 | B2* | 4/2014 | Tsai | H04L 51/063 |
| | | | | 709/206 |
| 9,338,027 | B2* | 5/2016 | Talwar | H04M 7/006 |
| 9,544,271 | B2* | 1/2017 | McFarland | H04L 61/2539 |
| 9,646,016 | B2* | 5/2017 | Ovadya | G06F 16/1748 |
| 2013/0265883 | A1* | 10/2013 | Henry | H04L 43/028 |
| | | | | 370/241 |
| 2022/0293254 | A1* | 9/2022 | Reynolds | G06F 3/04842 |
| 2022/0335015 | A1* | 10/2022 | Manson | G06F 16/137 |
| 2023/0230000 | A1* | 7/2023 | Fowles | G06F 16/90 |
| | | | | 705/7.23 |

* cited by examiner

*Primary Examiner* — James A Edwards
(74) *Attorney, Agent, or Firm* — TechLaw Ventures, PLLC; Terrence J. Edwards

(57) ABSTRACT

Aggregating data retrieved from communications between parties. A method includes receiving a requesting electronic communication sent from a data recipient to a data submitter, wherein the requesting electronic communication comprises a request for data to be assigned to an identified data bucket within an aggregated data package. The method includes receiving a responsive electronic communication sent from the data submitter to the data recipient. The method includes stripping data from the responsive electronic communication and storing the stripped data in the identified data bucket within the aggregated data package.

19 Claims, 11 Drawing Sheets

US 11,962,551 B1

AGGREGATING DATA RETRIEVED FROM COMMUNICATION CHANNELS

CROSS-REFERENCE TO RELATED APPLICATIONS

This application claims the benefit of U.S. Provisional patent Application No. 63/364,416, filed May 9, 2022, titled "AGGREGATING DATA RETRIEVED FROM COMMUNICATION CHANNELS," which is incorporated herein by reference in its entirety, including but not limited to those portions that specifically appear hereinafter, the incorporation by reference being made with the following exception: In the event that any portion of the above-referenced provisional application is inconsistent with this application, this application supersedes the above-referenced provisional application.

TECHNICAL FIELD

The disclosure relates generally to data partitioning and data aggregation and relates particularly to retrieving data from communication channels.

BACKGROUND

Numerous industries would benefit from automated data aggregation and analysis. However, when data is ingested from disparate sources, the data is often organized and described using different protocols. Additionally, numerous industries struggle with efficient data collection across multiple communication channels between parties. Often, parties will communicate by way of email, telephone, text message, video conference, and so forth, and it is difficult to capture data sent by way of multiple communication channels and compile that data into a centralized storage unit.

What is needed are improved means for capturing and storing data retrieved from communication channels between parties. Additionally, what is need are improved means for ingesting, normalizing, partitioning, and assessing data retrieved from disparate sources such that the data can be analyzed in real-time. Considering the foregoing, disclosed herein are systems, methods, and devices for data capture, ingestion, translation, and analysis.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood regarding the following description and accompanying drawings where.

DETAILED DESCRIPTION

Figure 1:
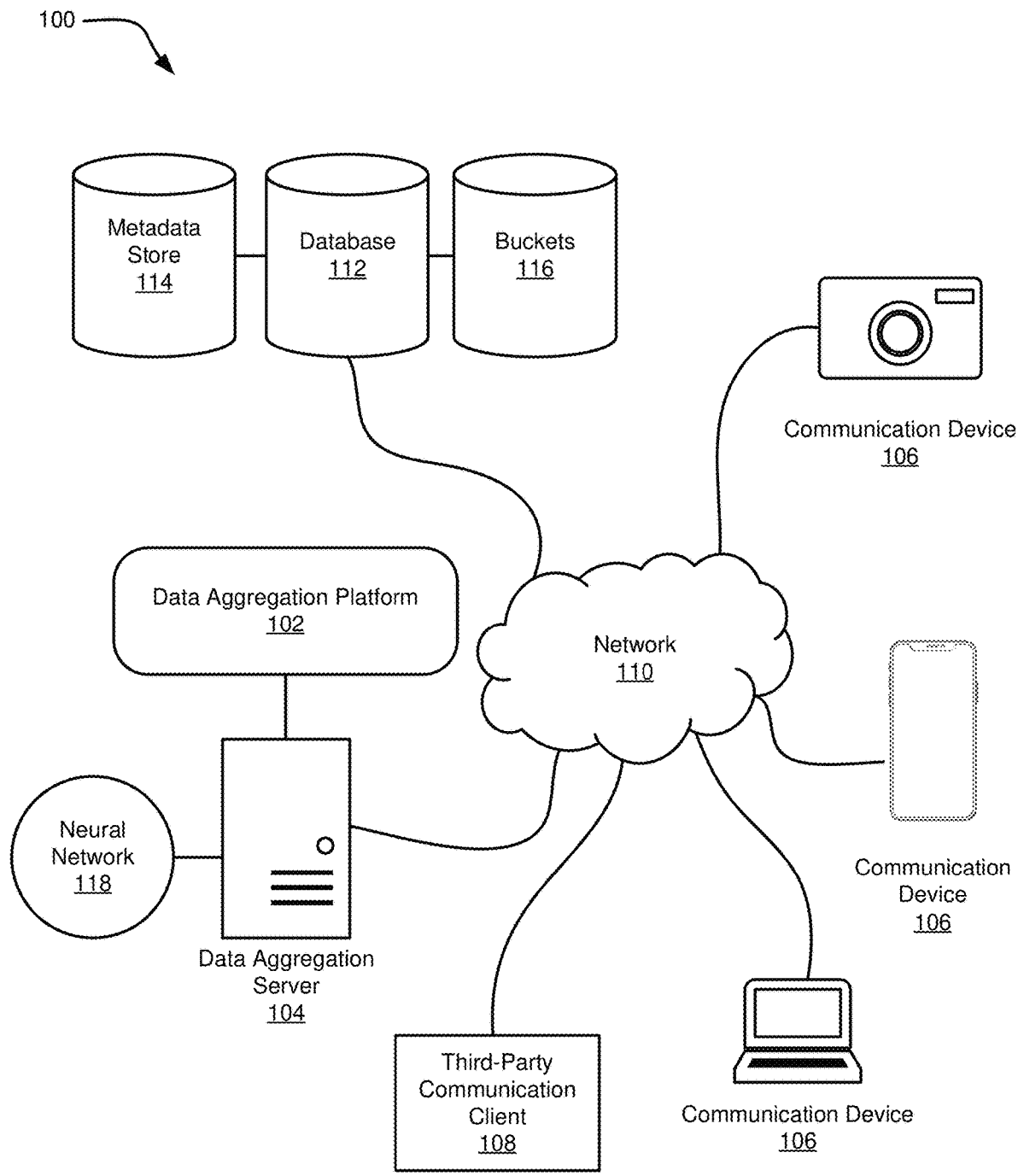
FIG. 1 is a schematic diagram of a system for data ingestion, normalization, aggregation, and analysis.

Disclosed herein are systems, methods, and devices for retrieving and aggregating data sent between parties by way of an established communication channel. A method includes generating an alias address for a data recipient, wherein the alias address is associated with a unique aggregated data package. The method includes receiving a communication sent to the alias address and stripping the communication of structured or unstructured data. The method includes storing the stripped structured or unstructured data in one or more data buckets associated with the unique aggregated data package.

Numerous industries struggle with efficient data collection and organization. For example, the lending industry (including, e.g., mortgage lending, commercial lending, consumer lending, and so forth) is often required to collect a large quantity of documents, unstructured files, and text submissions before processing a loan and determining whether an applicant qualifies for the loan. This same struggle applies to any industry that accepts data and documents from different clients or customers, including, for example, education admissions, job applications, requests for proposals, healthcare offices, law offices, accounting offices, and so forth. In most of these cases, the two parties (i.e., the party submitting the data and the party receiving the data) struggle to efficiently capture all the data, organize all the data, analyze all the data, and determine whether all the data has been properly received and categorized.

These challenges are aggravated when the parties communicate with one another by way of multiple communication channels. In many cases, the parties will communicate with each other through a variety of communication channels, including, for example, telephone, voice memorandum, text message, email, video conference, video memorandum, web-based data submission, and so forth. Traditional systems do not provide a means to capture all data exchanged between the parties in a central location, where the data can easily be viewed, edited, and analyzed.

Additionally, data aggregation generally presents numerous challenges, and these challenges are aggravated when data is retrieved from disparate sources that implement different protocols and conventions for classifying information. Even when data is gathered and summarized, further analysis is usually required before the aggregated data can be shared with, or communicated to, different audiences, or used as the basis for decision-making. Data aggregation includes collecting data, checking the data, verifying the data, transferring, and compiling the data, assessing quality of the data, packaging the data, disseminating, and reporting the data, and using the data for action. Each of these steps presents unique technical challenges when the data is retrieved from disparate sources that implement different conventions and protocols for classifying and organizing information.

Considering the foregoing, disclosed herein are systems, methods, and devices for resolving the technical challenges presented when aggregating data retrieved from one or more communication channels. The systems, methods, and devices described herein include means for securely and efficiently ingesting files and datapoints from a plurality of different sources, and then analyzing those files and datapoints to identify common classifications for the information described therein. The systems, methods, and devices described herein are implemented for classifying information, translating data describing the information, and then matching the data to buckets within an aggregated data package stored on a database. The buckets within the aggregated data package indicate different data classifications that are required before the aggregated data package can be deemed complete and ready for use in decision-making.

The systems, methods, and devices described herein may be particularly beneficial when implemented in a lending process. The commercial lending process, for example, is challenging for the lending officers because they spend a significant percentage of their time collecting documents from applicants and communicating with applicants. Lending offices typically must communicate with clients through multiple communication channels, including, for example, email, SMS, MMS, voice memorandum, video conference, video memorandum, telephone, and fax. The systems, methods, and devices described herein resolve these pain points by presenting a comprehensive and secure system to shorten the data aggregation process, increase communication between applicants and lenders, and increase the security of document exchange.

Before the structures, systems, and methods for data aggregation are disclosed and described, it is to be understood that this disclosure is not limited to the structures, configurations, process steps, and materials disclosed herein as such structures, configurations, process steps, and materials may vary somewhat. It is also to be understood that the terminology employed herein is used for the purpose of describing embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, to emphasize their implementation independence more particularly. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Referring now to the figures, FIG. 1 is a schematic diagram of a system 100 for data aggregation that can be implemented for increasing the efficiency of computing systems for ingesting, storing, and analyzing data. The system 100 includes a data aggregation platform 102 operated by a data aggregation server 104. The system 100 includes one or more communication devices 106 that receive and transmit information by way of the network 110. The system 100 includes a database 112 for storing ingested and partitioned data, training datasets, structured data, unstructured data, and so forth. The database 112 includes a metadata store 114 and one or more data buckets 116. Each of the data aggregation server 104, the database 112, and the communication devices 106 is in communication with a network 110 such as the Internet.

The data aggregation platform 102 stores, manages, and updates aggregated data packages. The data aggregation platform 102 includes a user interface and logic for managing datasets and enabling users to query, retrieve, and analyze the data. The data aggregation platform 102 is operated by the data aggregation server 104, which is in communication with other entities and databases by way of Application Program Interfaces (APIs), Secure File Transfer Protocols (SFTP), or other connections by way of the network 110.

An aggregated data package is a specialized data format comprising a plurality of data buckets. Each data bucket within the aggregated data package is associated with a certain datatype or data content. The aggregated data package stores structured information and unstructured information. In an example implementation, an aggregated data package is a manipulatable data form comprising commercial lending data. In this implementation, the aggregated data package may comprise text-based data buckets for "applicant name," "applicate date of birth," "company name," "requested loan amount," and so forth. Additionally, the aggregated data package includes additional data buckets for receiving unstructured files, such as images, videos, audio files, emails, chat communications, and so forth. These unstructured files are stored with a specific metadata tag in association with the aggregated data package.

The data aggregation server 104 provides storage and processing resources to support the data aggregation platform 102. The data aggregation platform serves as a go-between that intercepts communications between parties and scrapes data from those communications. 102 Additionally, the data aggregation platform 102 is a system for executing image analysis algorithms on unstructured files, executing predictive modeling algorithms, storing, and managing aggregated data packages, and storing and managing virtual files that represent that data stored within an aggregated data package.

The communication devices 106 include personal computing devices that can communicate with the data aggregation server 104 by way of the network 110. The communication devices 106 may include, for example, mobile phones, laptops, personal computers, servers, server groups, tablets, image sensors, cameras, scanners, desktop computers, set-top boxes, gaming consoles, smart televisions, smart watches, fitness bands, optical head-mounted displays, virtual reality headsets, smart glasses, HDMI or other electronic display dongles, personal digital assistants, and/or another computing device comprising a processor (e.g., a central processing unit (CPU)), a processor core, image sensors, cameras, a field programmable gate array (FPGA), or other programmable logic, an application specific integrated circuit (ASIC), a controller, a microcontroller, and/or another semiconductor integrated circuit device, a volatile memory, and/or a non-volatile storage medium. The communication devices 106 may comprise processing resources for executing instructions stored in non-transitory computer readable storage media. These instructions may be incorporated in an application stored locally to the communication device 106, an application accessible on a web browser, and so forth. The application enables a user to access the user interface for the data aggregation platform 102 to check submissions, upload files, verify whether files are accurately uploaded, receive feedback from the neural network 118, and so forth.

In an embodiment, a user accesses an account associated with the data aggregation platform 102 by way of the communication device 106. The user may be assigned a security role and location access to as many, or few, entities as is required by the user's position. Security roles restrict what information and/or functionality the user can access. The data aggregation platform 102 may be accessible on a mobile phone application. The mobile phone application uses the camera and networking capabilities of the mobile phone to capture images and upload those images to the data aggregation server 104 and neural network 118 for analysis.

The third-party communication clients 108 facilitate communications between users. The third-party communication clients 108 facilitate any applicable form of communication, including, for example, email, telephone, video conferencing, voice conferencing, VOIP (Voice over Internet Protocol), text messaging, web-based communications, fax, and so forth.

The third-party communication clients 108 include email communication clients. Examples include email services accessible to the public serviced by, Gmail®, Yahoo®, Apple®, AOL®, and so forth. Additionally, the email communication clients include email services that are not accessible to the public, including those services that are dedicated to workplaces, government agencies, private server groups, and so forth. The third-party communication clients 108 include telephonic communication clients. Examples of telephone communication providers include Comcast®, Verizon®, T-Mobile®, AT&T®, and so forth. The third-party communication clients 108 include video conferencing, VOIP, and audio-conferencing providers, such as, for example, Microsoft®, Zoom®, and others. The third-party communication clients 108 include text messaging service providers including, for example, Verizon®, T-Mobile®, AT&T®, and so forth. The third-party communication clients 108 include communication channels supported by social media websites and applications. The data aggregation server 104 may integrate with any suitable communication channel.

The database 112 is a repository of information, datasets, images, structured data, unstructured data, and training datasets for the neural network 118. The data aggregation server 104 may access the database 112 by way of an Application Program Interface (API) over the network 110 connection. The API allows the data aggregation server 104 to receive automatic updates from the database 112 as needed. In an embodiment, the database 112 is integrated on the data aggregation server 104 and is not independent of the storage and processing resources dedicated to the data aggregation server 104.

Data stored in the remote or cloud storage, such as the database 112, may include data, including images and related data, from many different entities, customers, locations, or the like. The stored data may be accessible to a classification system that includes a classification model, neural network, or other machine learning algorithm.

The database 112 may include a plurality of database instances, wherein each database instance is assigned to a different client account. In an implementation, the data aggregation platform 102 is implemented for ingesting, translating, and aggregating data for aggregated data packages, and in this case, the database 112 may include an independent database instance for each entity using the data aggregation platform 102. In an alternative embodiment, the data for each entity is stored in the same physical memory location, and permissions for reading or writing the data is controlled by way of permissions managed by the data aggregation platform 102.

The database 112 is partitioned into a plurality of aggregated data packages. Each aggregated data package includes a plurality of file buckets and a plurality of datapoint buckets. The file buckets comprise an indication of a certain type of file that must be ingested before the aggregated data package can be deemed complete. The datapoint buckets comprise an indication of a certain type of information that must be ingested before the aggregated data package can be deemed complete.

The database 112 may be structured as a directed graph file system (which may be referred to as a semantic file system). The directed graph file system structures data according to semantics and intent, rather than location. The directed graph file system allows data to be addressed by content (associative access).

The database 112 may be structured as a relational database. In a relational database, files and data are stored with predefined relationships to one another. The files and data are organized as a set of tables with columns and rows, and tables are used to hold information about the objects to be represented in the database 112.

In an example implementation, the aggregated data package is associated with a single data package for a commercial loan. The plurality of file buckets for this aggregated data package includes, for example, a first file bucket for an applicant tax return, a second file bucket for an applicant driver license or other government identification, a third file bucket for an applicant bank statement, a fourth file bucket for an applicant address verification, and so forth. Further in this example, the plurality of datapoint buckets for this aggregated data package include, for example, a first datapoint bucket for the applicant's name, a second datapoint bucket for the applicant's contact information, a third datapoint bucket for the applicant's credit score, a fourth datapoint bucket for the applicant's debt-to-income ratio, and so forth. When each of the file buckets and the datapoint buckets are filled, the aggregated data package may be deemed complete, and thus, the commercial data package may be deemed complete. The datapoint buckets may be filled with information that has been read and retrieved from a file such as an image, scan, document, video, and so forth. The datapoint buckets may further be filled with information retrieved from third-party services that communicate with the data aggregation server 104 by way of a secure Application Programming Interface (API).

The neural network 118 comprises storage and processing resources for executing a machine learning or artificial intelligence algorithm. The neural network 118 may include a deep learning convolutional neural network (CNN). The convolutional neural network is based on the shared weight architecture of convolution kernel or filters that slide along input features and provide translation equivalent responses known as feature maps. The neural network 118 may include one or more independent neural networks trained to implement different machine learning processes.

Figure 2:
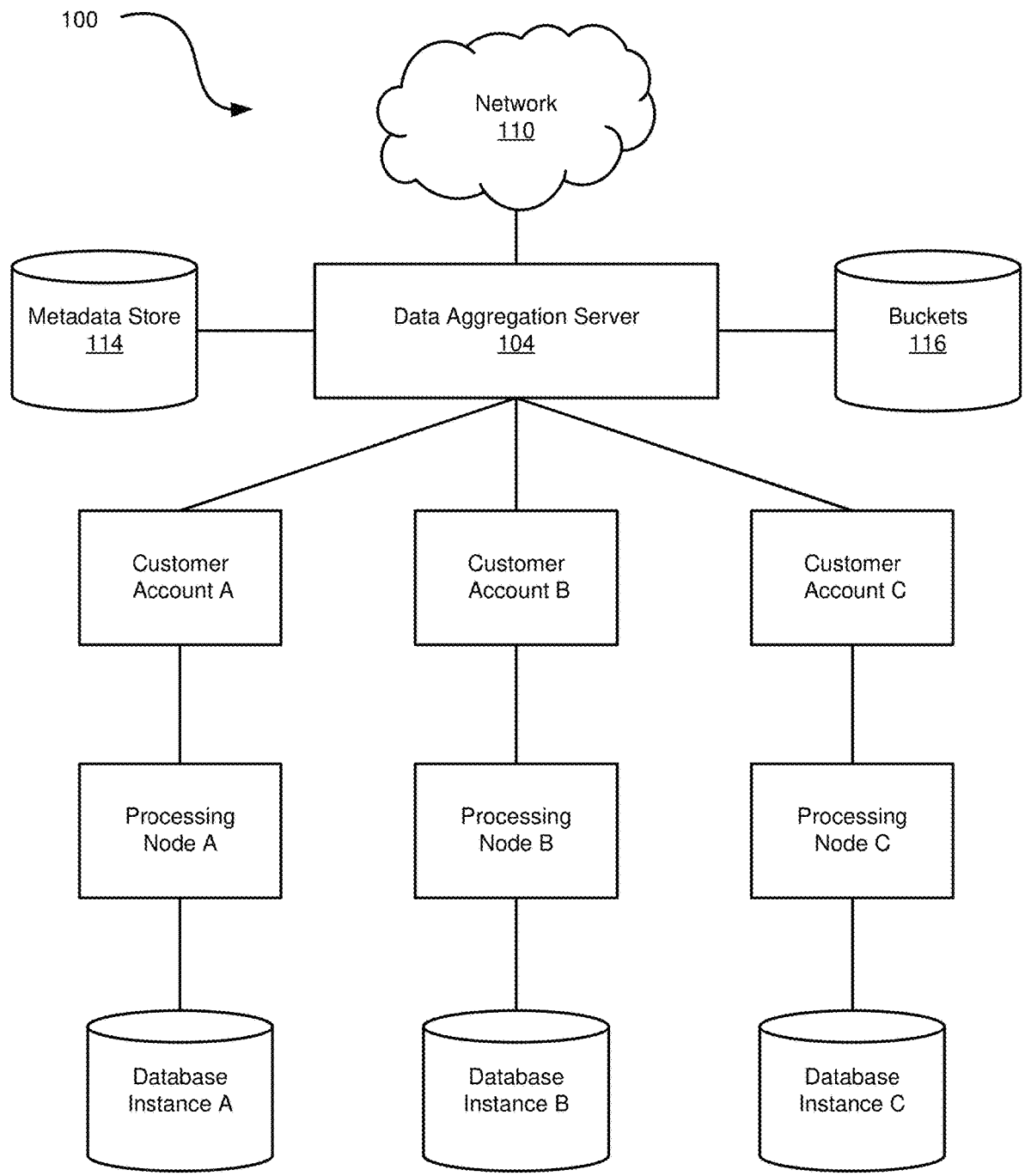
FIG. 2 is a schematic diagram of a system for data management and permissioned access to database entries.

FIG. 2 is a schematic diagram of a system 200 for data management and permissioned access to database entries. The systems described herein may be implemented in environments with highly sensitive data, and therefore, it can be imperative to ensure there is no crosstalk between customer or applicant accounts. The system includes a resource manager executed by the data aggregation server 104.

The data aggregation server 104 oversees data ingestion and data management for a plurality of client accounts, such as Customer Account A, Customer Account B, and Customer Account C. The data aggregation server 104 manages an execution platform that includes a plurality of processing nodes associated with the client accounts. The customer accounts may share the processing resources of the execution platform and/or may be assigned independent processing resources. FIG. 2 illustrates a plurality of processing nodes within the execution platform, including Processing Node A, Processing Node B, and Processing Node C.

The data aggregation server 104 manages the ingestion, normalization, organization, and storage of data entries within the storage resources. The storage resources include data entries pertaining to transactions associated with the client accounts. The customer accounts may have secure, permissioned access to data entries based on permissions metadata stored on the metadata store 114. The storage resources include data entries stored across a plurality of database instances, including, for example, Database Instance A, Database Instance B, and Database Instance C. It should be appreciated that the data aggregation server 104 may be in communication with any number of client accounts, processing nodes, and client database instances.

The storage resources store data in partitions that can be queried by the data aggregation server 104. The data entries in the storage resources are immutable such that the entries cannot be deleted or modified and can only be replaced by storing a new, superseding data entry.

The network 110 includes any type of network, such as a local area network, a wide area network, the Internet, a cellular communication network, or any combination of two or more communication networks. The data aggregation server 104 communicates with some client accounts and outside parties by way of communication protocols such as SWIFT MT (Society for Worldwide Interbank Financial Telecommunication Message Type) messages (such as MT 2XX, 5XX, 9XX), ISO 9022 (a standard for electronic data interchange between financial institutions), and proprietary application interfaces. The data aggregation server 104 ingests data and receives communications from client accounts (and entities associated with the client accounts) using secure APIs (Application Program Interfaces) and other protocols. The data aggregation server 104 can integrate with existing financial institutions, banks, clearinghouses, and exchanges without significant modification to the institution's systems.

The data aggregation server 104 determines whether a user is authorized, and what data that user is authorized to access. The data aggregation server 104 verifies the identity of each machine using security certificates and cryptographic keys. The data aggregation server 104 stores a listing of authorized users and roles, which may include actual users, systems, devices, or applications that are authorized to interact with the data aggregation server 104 and/or access certain data stored on the storage resources. The integrity of the system is provided using secure channels to communicate between the data aggregation server 104 and external systems. In some embodiments, communication between the data aggregation server 104 and external systems is performed using highly secure TLS (Transport Layer Security) with well-established handshakes between the data aggregation server 104 and the external systems. Implementations may use dedicated virtual private clouds (VPCs) for communication between the data aggregation server 104 and any external systems. Dedicated VPCs offer clients the ability to set up their own security and rules for accessing data aggregation server 104. In some situations, an external system or user may use the DirectConnect network service for better service-level agreements and security.

The data aggregation server 104 supports role-based access control of workflows and the actions associated with workflows. In some embodiments, users can customize a workflow to add custom steps to integrate with external systems. Additionally, system developers can develop custom workflows to support new business processes. In particular implementations, some of the actions performed by a workflow can be manual approvals, a SWIFT message request/response, scheduled or time-based actions, and the like. In some embodiments, roles can be assigned to users and access control lists can be applied to roles. An access control list controls access to actions and operations on entities within a network. This approach provides a hierarchical way of assigning privileges to users. A set of roles also include roles related to replication of data, which allows the data aggregation server 104 to identify what data can be replicated and who is the authorized user to be receiving the data at an external system.

The data aggregation platform 102 manages authentication of users. Authentication refers to how a user signs into the data aggregation platform 102 to access data within the database 112. The user must be authenticated as the root user or an Identity and Access Management (IAM) role. Additionally, a user may be assigned a tenant's single sign-on authentication. In these cases, an administrator previously set up identity federation using IAM roles. The data aggregation platform 102 manages root users, IAM users and groups, and service administrators. The data aggregation platform 102 provides cross-service access to some features with principal permissions, service roles, or service-linked roles.

Each of the Customer Accounts may represent a tenant on the cloud-based database 112 and/or an individual user account within a tenant of the cloud-based database 112. When a user signs up on the data aggregation platform 102, the user provides a unique username and password that are digitally bound to the user's email address, which is also unique. Each user is assigned one or more data buckets to be filled in connection with an aggregated data package. The data buckets may constitute "questions" to be answered in furtherance of completing the aggregated data package. The data buckets may be filled by documents to be uploaded, text fields, voice messages, video recordings, and other data types that may be passed to another party wishing to access data within the aggregated data package. Each user is bound to one or more aggregated data packages managed by the data aggregation server 104, and all data associated with that user is stored underneath the user's username within the platform. Any aggregated data package the user creates becomes visible when the user logs into the system under their username.

All data within the data aggregation platform 102 is stored on a cloud-based database. The data is stored together and credentialed by username. Data is classified based on which username created the data bucket and which username provided data for filling the data bucket. Each data bucket is created for a certain document, text response, voice response, image response, video response, or other response, and the data bucket is filled when a user provides the applicable data for filing the data bucket. Data is further classified based on what type of document the data is and which aggregated data package the data applies to. All this information is stored in the metadata store 114.

The data aggregation platform 104 logically classifies data that is ingested from disparate sources and then partitions the data with assigned partitions across the multiple database instances. The data aggregation server 104 classifies data, controls user access, ensures privacy between users and their communications, and combines the data into an aggregated data package. The data may additionally be exported in a desired format, such as one or more PDF documents. The one or more PDF summary documents may logically link major data sections for easy access and readability by bank management and committee members.

The system 100 resolves numerous pain points associated with broadscale applications and communications between separate parties. The system 100 may specifically be applied in any industry wherein two or more parties need to exchange data. The system 100 enables data recipients to regularly communicate with data submitters and view a real-time data package pipeline. The data aggregation platform 102 provides a user interface to data recipients and data submitters to visualize where the data package is within the data package pipeline and to visualize the additional data that is required to process the data package. The data aggregation platform 102 oversees the retrieval of data and provides real-time insight to the data submitter regarding what data must still be gathered. This ensures that data recipients do not need to spend significant time tracking down information and can instead focus on relationships and acquiring new data packages. The data aggregation platform 102 is a unified communication platform for all stakeholders.

Figure 3:
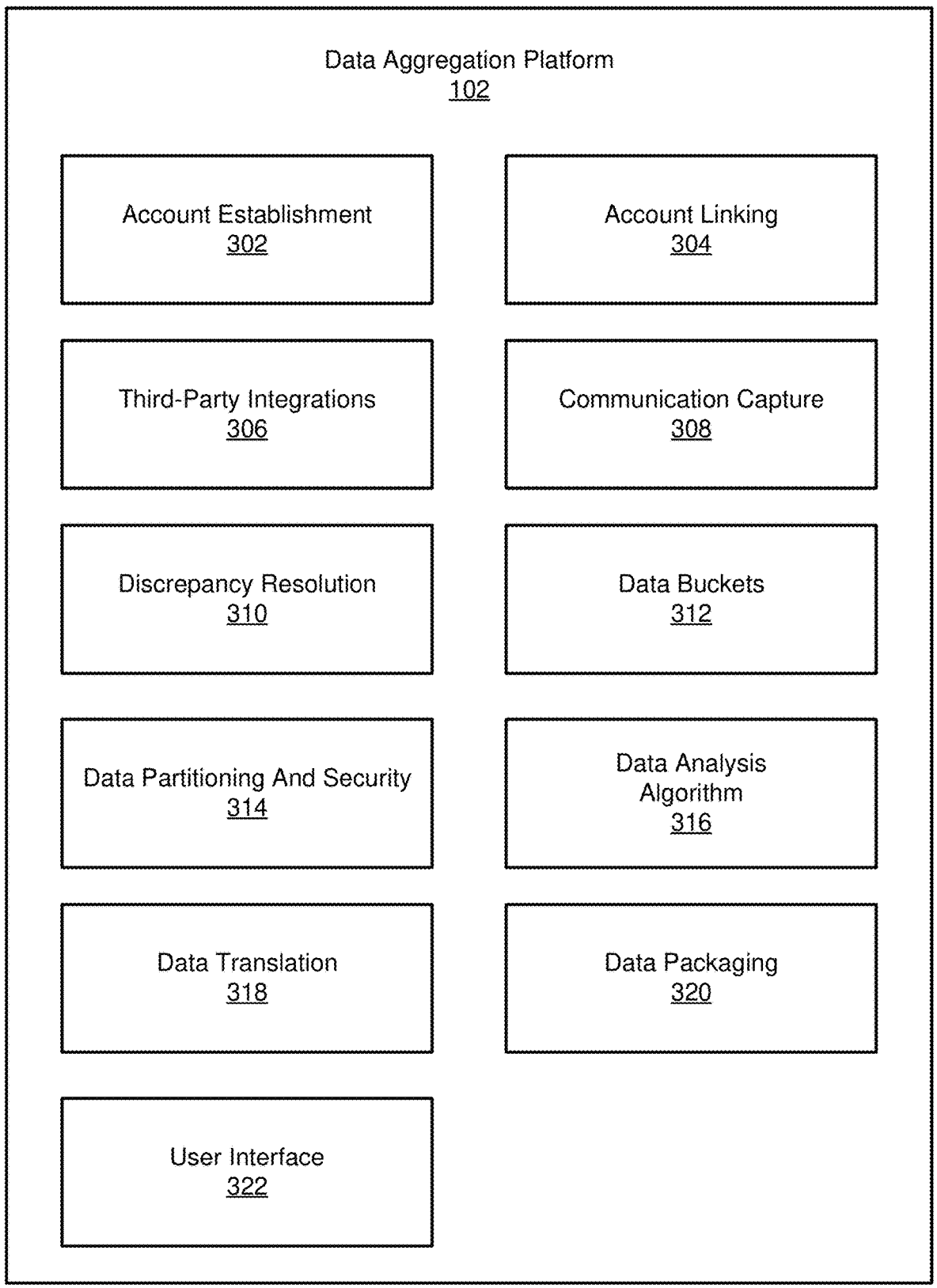
FIG. 3 is a schematic block diagram illustrating components of a data aggregation platform.

FIG. 3 is a schematic block diagram illustrating potential modules of the data aggregation platform 102, including processes and modules executed by third parties in communication with the data aggregation server 104. The data aggregation platform 102 includes an account establishment 302 module and account linking 304 module for generating and linking user accounts within the data aggregation platform 102. Linked user accounts may be associated with a common application or aggregated data package. The data aggregation platform 102 includes means for third-party integrations 306. The data aggregation platform 102 includes a communication capture module 308 that receives and/or intercepts communications between parties to scrap data from those communications. The data aggregation platform 102 includes a discrepancy resolution module 310, data bucket module 312, and data partitioning and security module 314. The data aggregation platform 102 may include or communicate with a data analysis algorithm 316. The data aggregation platform 102 includes a data translation module 318 and data packaging module 320. The data aggregation platform 102 includes a user interface module 322 that renders one or more user interfaces.

The account establishment module 302 generates a new account to be associated with a unique aggregated data package and/or connects an existing account with the unique aggregated data package. The data aggregation platform 102 will permit an account to read and/or write data associated with the unique aggregated data package only if the account has been formally associated with the unique aggregated data package by the account establishment module 302.

The account linking module 304 associates accounts with a unique aggregated data package. The unique aggregated data package may be prepared in connection with a commercial data package, a school data package, a private data package, a government grant data package, a request for proposals, a data package provided to an accounting office, a data package provided to an insurance provider, a data package provided to a healthcare provider, a data package provided to a legal services provider, and so forth. The account linking module 304 identifies a storage component of the database 112 (such as a table or grouping of tables) that are associated with the aggregated data package. The account linking module 304 assigns permissions to the applicable accounts to access at least a portion of the data stored in the database 112 for the unique aggregated data package. The account linking module 304s may independently assign read and write permissions to data stored on the database 112 for the unique aggregated data package.

The third-party integrations module 306 establishes secure connections with third-party aggregators 110. The third-party integrations module 306 stores a listing of authorized machines, devices, and accounts (i.e., "whitelisted"). The data aggregation server 104 securely communicates with outside parties by way of secure API access points.

In an implementation, the system 100 is implemented for ingesting, storing, tracking, and analyzing data used for a data package such as a commercial lending application. In this implementation, the third-party integrations module 306 of the data aggregation server 104 communicates with one or more credit reporting agencies, such as TransUnion®, Equifax®, or Experian®, to retrieve a current listing of a user's financial obligations and a current credit score for the user. The data aggregation server 104 translates the data retrieved from the credit reporting agency from XML to PDF, JSON, and so forth as needed.

Further to the above-recited implementation, wherein the data aggregation platform 102 prepares data for a commercial lending application, the third-party integration 306 component retrieves background information about a user or entity from a third-party agency. The third-party agency may include, for example, TransUnion TLOxp® or Thomas Reuters CLEAR®. The data aggregation server 104 translates the data retrieved from the background data agency from XML to PDF, dynamic application questions, related entity graph structures, and ownership structures. The data aggregation server 104 retrieves the background information from the background data agency and generates an ownership structure and/or related entity graph that illustrates the user's ownership of various entities and assets. The data aggregation server 104 renders a user interface displaying the ownership structure and/or related entity graph on the data aggregation platform 102.

Further to the above-recited implementation, wherein the data aggregation platform 102 prepares data for a commercial lending application, the third-party integration 306 component retrieves real-time banking and asset information about a user or entity from a third-party agency. The third-party agency may include, for example, the user's personal banking institution, the user's personal mortgage servicer, the user's personal brokerage institution, business, or personal accounting software for managing the user's assets, and so forth. The financial institutions and account software may be associated with the user individually and/or businesses or other entities associated with the user. The data aggregation server 104 translates the data retrieved from the financial institution or accounting software from XML to PDF, credit spreading, and credit profile. The data aggregation server 104 retrieves the real-time financial information from the financial institutions and accounting software to render a user interface that provides a visualization of the user's credit spreading and credit profile.

The communication capture module 308 analyzes communications between a data submitter and a data recipient. The communication capture module 308 "intercepts" communications between the data submitter and the data recipient, and scrapes data from those communications. The communication capture module 308 automatically retrieves structured and unstructured data from a communication, and then routes that data to an applicable data bucket within an applicable aggregated data package.

The communication capture module 308 may additionally share stripped data with authorized third parties. In an example use-case, the aggregated data package is a conglomeration of bookkeeping and/or accounting data. The data submitter includes one or more parties submitting bookkeeping and/or accounting data, and the data recipient is an accountant that requires the aggregated data package to process a tax return. In this case, the aggregated data package may be tied to an authorized third-party, such as a person responsible for the accounting documents, a bookkeeper who prepared the accounting documents, and so forth. The stripped data may be automatically provided to any of the data recipient or the authorized third parties.

The communication capture module 308 additionally initiates smart reminder notifications for the data submitter. The smart reminder notifications may include a listing of all data buckets that have not yet been filled within the aggregated data package. Additionally, the timing and frequency of the reminder notifications is adjusted and optimized depending on how many of the data buckets have yet to be filled and/or the deadline for completing the aggregated data package. The frequency and content of the reminder notifications may be optimized by a computer-implemented algorithm or may be selected by a user, such as a data submitter or a data recipient.

In an example use-case, the aggregated data package is a loan application, and the plurality of data buckets associated with the loan application each include a "question" that must be answered to process the loan application. These "questions" are answered with textual responses, files, or other data points as needed for completing the loan application. The communication capture module 308 notifies the data submitter (in this case, the loan applicant) which textual responses, files, or other data points still have not been received to complete the loan application. These notifications may become more frequent as the deadline for completing the loan application draws nearer. For example, if the loan application does not need to be completed for several weeks or months, then the communication capture module 308 may remind the data submitter every few days that one or more questions have not been answered. If the deadline for the loan application is several days away, then the communication capture module 308 may remind the loan application several times each day, or even hourly, that one or more questions on the loan application have not yet been answered. The quantity and frequency of these reminder notifications may be set by the loan applicant and/or the lender.

The discrepancy resolution module 310 identifies discrepancies in the data stored on the database 112. The discrepancy resolution module 310 may be configured to identify discrepancies only within a single aggregated data package. For example, in the case of a commercial lending data package, the discrepancy resolution module 310 identifies conflicting datapoints associated with that aggregated data package. The discrepancy resolution module 310 may communicate with the data analysis algorithm 316 component to determine that data manually input by the user conflicts with information presented in documents that have been uploaded by the user.

In an implementation, the data aggregation platform 102 aggregates and manages data for discrete aggregated data packages. The discrepancy resolution module 310 identifies discrepancies within the data within a single aggregated data package. In an example implementation, the aggregated data package is a commercial loan application for three applicants. The aggregated data package includes a plurality of data buckets for receiving different structured and unstructured data, including, for example, images of government-issued identifications, tax returns, secure real-time connections to banks, credit units, brokerages, and so forth to aggregate financial data, information regarding assets, and so forth. The discrepancy resolution module 310 determines whether any two or more data points within the aggregated data package are inconsistent with one another or contradict one another. For example, an applicant's government-issued identification may include an address, name, or date of birth that is inconsistent with the address, name, or date of birth that was manually supplied by the applicant.

The discrepancy resolution module 310 generates a notification when a data discrepancy has been identified. The notification may include a workflow trigger to execute a software agent (computer-implemented) configured to automatically retrieve additional information pertaining to the aggregated data package and/or request additional information for the aggregated data package. The notification may include a notification to a human user or operator, such as an applicant, loan officer, software administrator, backend administrator, manager, and so forth.

The data bucket module 312 assigns data to certain data buckets associated with the aggregated data package. The aggregated data package includes a plurality of data buckets, wherein each data bucket is intended to be associated with data of a certain type and content. In an example implementation, the aggregated data package is a commercial loan application. In this example implementation, the aggregated data package may include one data bucket intending to receive an image of an applicant's government-issued identification, and another data bucket intending to receive a copy of the applicant's tax return, and so forth. The data buckets may be assigned to receive structured or unstructured data. One or more data buckets may be in communication with an API to continually receive updated information in real-time. In an embodiment, a data bucket includes a secure connection to a third-party aggregator 110 such as a bank, credit union, lender, social media, government agency, and so forth.

The data bucket module 312 may receive an output from the data analysis algorithm 316 comprising one or more textual characters and/or words that were extracted from an unstructured file. The data bucket module 312 may then take those textual characters and/or words and assign them to individual data buckets associated with the aggregated data package. For example, if the aggregated data package is a commercial loan application, then the data bucket module 312 may receive a plurality of textual outputs from the data analysis algorithm 316 that were extracted from a file such as a video file, audio file, PDF document, text document, image, or other unstructured file. The data bucket module 312 receives these textual outputs and classifies and/or assigns them to a data bucket within the aggregated data package.

The data bucket module 312 may then classify the original unstructured file itself (i.e., the image, scan, PDF, etc.) into a certain data bucket based on the textual output from the data analysis algorithm 316. The data bucket module 312 uses the textual output from the data analysis algorithm 316 to classify the content of the unstructured file and determine where the unstructured file should be saved within the aggregated data package.

The data bucket module 312 assigns files to data buckets within various data models. The data bucket module 312 may integrate with a relational database model, a no-SQL data model, a parent-child relationship data model, and others. In an implementation, the aggregated data packages are stored in a parent-child relationship data model, wherein the parent is the aggregated data package, which includes numerous levels of child relationships. In an example implementation, the parent is a commercial loan application, the child is an applicant for the commercial loan application, and then numerous further child relationships are associated with the application, including for example, a child data bucket for the applicant's government-issued identification, name, address, contact information, age, assets, tax returns, and so forth.

The data bucket module 312 may receive data that has been stripped from a communication between a data submitter and a data recipient. In this case, the communication may be a response to a specific request for data. For example, the data recipient may request a certain document such as an image of a person's photographic identification. The data submitter may respond to this request and attach a document to the response. The data bucket module 312 determines whether the response includes the person's photographic identification. If the response includes the photographic identification, then the data bucket module 312 will assign the photographic identification to the appropriate data bucket within the aggregated data package. If the response does not include the photographic identification, then the data bucket module 312 will cause the data aggregation platform 102 to transmit a new request to the data submitter for the appropriate photographic identification.

The data bucket module 312 assigns metadata to each structured or unstructured file that it places within the data model. The data bucket module 312 ensures that each data point includes metadata associated with a certain aggregated data package.

The data partitioning and security module 314 ingests, normalizes, partitions, and assigns security permissions to the data stored on the database 112. Database permissions are assigned with an authorization system that uses one or more of unique username, email address, phone number, and password assigned to a user. The data partitioning and security module 314 may additionally implement two-factor authentication or multi-factor authentication protocols. The permissions metadata is stored in two or more database instances. This permissions metadata indicates what data each user is permitted to read and/or write to.

The data aggregation server 104 may include or communicate with the data analysis algorithm 316, which analyzes data uploaded to the database 112 to determine the information depicted in the data. The data analysis algorithm 316 may include a neural network or machine learning algorithm. However, the data analysis algorithm 316 is not limited to a machine learning algorithm or neural network and may include other algorithms for performing data processing. For example, the data analysis algorithm 316 may instead include a gradient boosting decision tree, logistic regression, rules-based algorithm, or other suitable algorithm.

The files processed by the data analysis algorithm 316 may include images, scans, videos, renders of digital documents, digital signatures, audio files, and so forth. The data analysis algorithm 316 component may include a neural network or machine learning algorithm configured to "read" or "listen" to a file and identify the information depicted in the document, whether that information is conveyed through audio data, image data, text data, and so forth. The data analysis algorithm 316 communicates with the discrepancy resolution module 310 to determine whether documents uploaded by an account are consistent with other data that has been manually-input or otherwise ingested for the account.

The data analysis algorithm 316 identifies objects of interest and textual characters in unstructured data. An unstructured file (or unstructured data) includes information that does not have a pre-defined data model or is not organized in a pre-defined manner. Unstructured files may be human generated, or machine generated. Examples of unstructured files includes, for example, audio files, video files, images, Microsoft© Word documents, Microsoft® PowerPoint®, emails, chat message logs, data from social networking sites, text messages, locations, call recordings, audio files, videos, portable document format (PDF) files, images, or scans of hardcopy documents, and so forth. The data analysis algorithm 316 may include one or more independent neural networks that are each trained to perform different types of files analysis. The data analysis algorithm 316 may include a neural network trained to identify and/or classify objects of interest within image or video data. The data analysis algorithm 316 may include a neural network trained to identify and/or classify words or music recorded in audio data. The data analysis algorithm 316 may include a neural network trained to identify textual characters and words in an image, scan, video stream, or other form of unstructured data.

The data analysis algorithm 316 includes a machine learning algorithm trained to execute optical character recognition processes to identify one or more words or textual characters in an unstructured file. Textual characters include letters, numbers, punctuation characters, emojis, and other characters. The data analysis algorithm 316 is trained to "read" an unstructured file to identify textual characters and/or words within the file, and further to classify the content of the textual characters and/or words within the file.

Optical character recognition automatically analyzes printed and/or handwritten textual characters and translates those characters into a form that a computer can process and understand. Optical character recognition includes the process of turning a picture or scan of text into text itself, or in other words, translating an image (or other unstructured data file) into a text file, such as a TXT or DOC file. The data analysis algorithm 316 is trained on a plurality of vast datasets comprising different fonts, different types of handwriting, different languages, different textual characters, and so forth.

In an implementation, the data analysis algorithm 316 is executed by one or more third-party entities in communication with the data aggregation server 104. In another implementation, the data analysis algorithm 316 is executed by the data aggregation server 104 itself.

The data analysis algorithm 316 is trained to identify the content of an unstructured file. In an example implementation, the data analysis algorithm 316 determines that an ingested file is, for example, a driver's license, passport, tax return, financial statement, photograph of an asset, and so forth. The data analysis algorithm 316 provides this outputs to the data bucket module 312, which is then configured to place the file in the appropriate data bucket for an aggregated data package.

The data translation module 318 analyzes data retrieved from disparate sources and classifies the information based on content. The data translation module 318 implements Optical Character Recognition (OCR) algorithms and builds a database of keyword or keyword pairs that uniquely certain documents. For example, certain keywords or keyword pairs identify documents or portions of documents as comprising a year, natural language statement, label, name, financial data, and other unique items. The data translation module 318 assigns an identity to a document based on the OCR output.

The data translation module 318 resolves a technical problem pertaining to identifying the correct keywords to ensure accurate classification of a document. If the data translation module 318 does not output the correct keywords or keyword pairs, then document may be misclassified and stored with incorrect metadata on the database.

The data packaging module 320 partitions data into discrete data packages, wherein each data package represents a specific application, event, or other organizational structure. In an implementation, each data package represents an application for a commercial lending application, a real property lending application, an educational admissions application, a job application, a private lending application, a government lending application, a leasing application, and so forth. The data package includes an indication of which users are associated with the data package, an indication of the permissions and roles for each user associated with the data package, and an indication of what questions and rules are associated with the data package.

Each data package includes one or more "questions" that serve as data buckets for receiving a certain document, text response, file, or other data format. In an example implementation, wherein the data package represents a data package, the "questions" may include, for example, a data bucket for a tax return, a data bucket for a financial statement, data buckets for personal demographics information, data buckets for specific parameters or agreements, a data bucket for images or videos of property associated with the data package, and so forth. Each data bucket "question" may be filled with one or more "answers" to the question, wherein the answers include files, documents, text responses, and other data formats. The data package questions are generated by an administrator or other user assigned to the data package.

The data packaging module 320 is tenant-specific and may operate under different rules for different tenants. For example, a first tenant may establish rules for user permissions, which types of documents are accepted, how many of each type of document must be ingested, and so forth. The data packaging module 320 generates a shell for a data package that comprises one or more data bucket questions based on the tenant-specific parameters for the tenant assigned to that data package 320.

Each data package may be stored on a separate database instance (see Database Instances in FIG. 2) to ensure there is no crosstalk between various customer accounts and tenants. In an alternative embodiment, each data package may be stored across shared storage resources, and the read/write permissions for each data package are established on the metadata store 114.

The data packaging module 320 may generate a data package specific to a data package that is regulated by an administrative agency, the government, a corporate agency, or some other entity. In an example implementation, in the United States, the data packaging module 320 creates data packages for a Small Business Administration (SBA) loan type. This data package is configured to export data in the necessary formats associated with the SBA loan, including, for example, 504 and 7(a) forms. The data package associated with the SBA loan will include an SBA folder structure that comprises certain permissions for the data stored therein, and further comprises defined formats for the data stored therein and exported to applicants and lenders associated with the data package.

The user interface module 322 renders one or more user interfaces representing the data aggregation platform 102. The user interface module 322 renders different user interfaces depending on a user's permissions. For example, a user that has initiated the creation of a unique aggregated data package may be given broader permissions than a user who is submitting data to the aggregated data package, or a user who is merely receiving a completed version of the aggregated data package, and so forth.

The user interface module 322 renders one or more user interfaces that display the data that has been ingested and stored in connection with the aggregated data package. The user interface module 322 may render the user interface to indicate how many files, textual responses, and other data points have been stored within the aggregated data package, and whether those files, textual responses, and other data points have been classified within a data bucket. The user interface module 322 renders the user interface to prompt a user to classify data that is stored within a general data bucket and thus, has not yet been stored as the "answer" to a unique data bucket associated with a unique "question."

The user interface module 322 renders user interfaces to be displayed on a webpage or application. In an implementation, the user interface module 322 renders a webpage that is accessible by way of a hyperlink. The webpage is associated with one or more datapoints for the aggregated data package and may specifically indicate whether those datapoints have been associated with a certain data bucket. In an implementation, the communication module 308 provides the hyperlink to a user in response to stripping data from a communication and storing the stripped data within an applicable data bucket (i.e., the general data bucket or a unique data bucket). In this implementation, the user receiving the hyperlink may visit the webpage to view and/or edit the stripped data. The user may receive the hyperlink in lieu of or in addition to receiving a forwarded communication that contains the stripped data.

Figure 4:
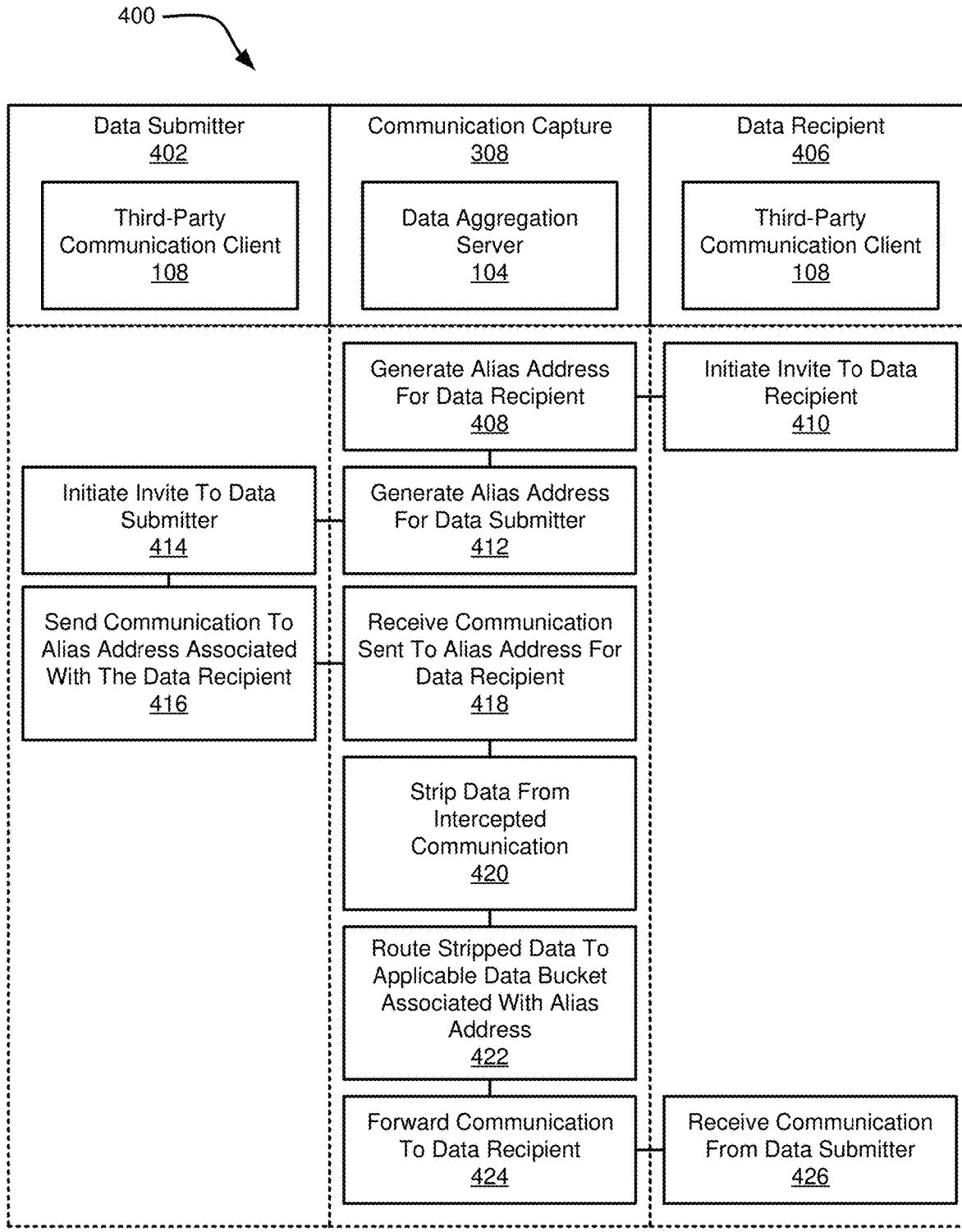
FIG. 4 is a schematic block diagram of a process flow for retrieving and aggregating data attached to communications between parties.

FIG. 4 is a schematic block diagram of a process flow 400 between parties in one or more communication channels. The process flow 400 is specifically directed to receiving two-way communications between a data submitter 402 and a data recipient 406, and stripping data from those two-way communications. The process flow 400 is performed by a data submitter 402 and a data recipient 402. Each of the data submitter 402 and the data recipient 406 may be an individual or entity using a communication channel facilitated by a third-party communication client 108. The communication channel may include, for example, an email communication channel, a text message communication channel, a video conferencing or audio-conferencing communication channel, a telephonic communication channel, a fax communication channel, a web-based communication channel, and so forth. The data aggregation server 104 stands between the data submitter 402 and the data recipient 406 by receiving messages from the third-party communication clients 108.

The communication capture module 308 is executed by the data aggregation server 104 and is a component of the data aggregation platform 102. The communication capture module 308 receives communications from the third-party communication clients 108 associated with each of the one or more data submitters 402 and each of the one or more data recipients 406. The communication capture module 308 serves as a go-between that receives communications, strips the communications of data, and then stores that data on the database 112. The communication capture module 308 identifies an aggregated data package that will receive data from the data submitter 402 and be provided to the data recipient 406. The communication capture module 308 further identifies one or more data buckets within the aggregated data package. The communication capture module 308 fills the one or more data buckets with data that has been stripped from communications between the data submitter 402 and the data recipient 406.

The process flow 400 includes the communication capture module 308 generating at 408 an alias address for the data recipient and initiating an invite at 410 to the data recipient. Additionally, the process flow 400 includes the communication capture module 308 generating at 412 an alias address for the data submitter and initiating an invite at 414 to the data submitter. The data submitter 402 and the data recipient 406 each receive an alias address that is unique for a certain aggregated data package. In an example use-case, the certain aggregated data package is a single commercial loan application between the data submitter (the applicant) and the data recipient (the lender). In this use-case, each of the data submitter 402 and the data recipient 406 will receive an alias address that is unique to this commercial loan application.

The alias addresses are unique to the data aggregation platform 102 and are serviced by the data aggregation server 104. In an example implementation, the alias addresses are alias email addresses. However, it should be appreciated that the alias address may include an alias telephone number, an alias data recipient for a video conferencing or audio-conferencing system, and alias address for a web-based communication, and so forth. In the case of an alias email address, the data submitter 402 has a personal email address such as submitter@email.com. The communication capture module 308 generates an alias address for the data submitter 402 that is unique to a single aggregated data package being serviced by the data aggregation platform 102. The alias email address may be called, for example, submitter.package123 @ data-aggregation.com. Likewise, the data recipient 406 will have a personal email address that may be serviced by the same third-party communication client 108 as the data submitter 402, or a different third-party communication client 108 than the data submitter 404. The communication capture module 308 generates an alias address for the data recipient such as recipient.package123 @data-aggregation.com. The communication capture module 308 generates a unique alias address for each of one or more data submitters 402 and one or more data recipients 406 that are associated with an identified aggregated data package.

The communication capture module 308 sends invitation communications to each of the data submitter 402 and the data recipient 406. The invitation communication begins a communication thread between the data submitter 402 and the data recipient 406 that is managed and overseen by the data aggregation platform 102. If the communication channel is email, then the invitation communication is an email sent from the data aggregation platform 102 to the personal email address of the data submitter 402 and/or the data recipient 406. When the data submitter 402 wishes to contact the data recipient 406, the data submitter 402 may respond to the communication thread that was initiated by the invitation email. This will cause the data recipient's 406 communication to be routed to the alias address associated with the data recipient 406 and the particular aggregated data package. Additionally, the data submitter 402 may directly contact the data recipient 406 (outside the communication thread) by sending an email to the alias address for the data recipient 406 and the particular aggregated data package. Likewise, the data recipient 406 may contact the data submitter 402 by sending an email to the alias address associated with the data submitter 402 and the particular aggregated data package.

The process flow 400 continues and the data submitter 402 sends at 416 a communication to the alias address associated with the data recipient and the particular aggregated data package. The data submitter 402 may send this communication directly to the applicable alias address or may respond to the invitation communication sent by the data aggregation platform 102. The communication capture module 308 receives at 418 the communication sent to the alias address for the data recipient. The communication capture module 308 "intercepts" the communication intended for the data recipient 406 because the alias address for the data recipient is serviced by the data aggregation server 104. The communication capture module 308 strips at 420 the data from the "intercepted" communication prior to forwarding the communication to the data recipient 406 and/or notifying the data recipient 406 that data was retrieved from the communication.

The communication capture module 308 routes at 422 the stripped data to an applicable data bucket associated with the aggregated data package that is associated with the alias address. Finally, the communication capture module 308 forwards the communication at 424 to the data recipient 406 (or notifies the data recipient 406 of the communication by some other means).

In an implementation, the communication capture module 308 stores the stripped data on a cloud-based database and generates a secure hyperlink to access the stripped data. The communication capture module 308 may provide the secure hyperlink to the data recipient 406. Thus, the data recipient 406 may access the stripped data by clicking on the secure hyperlink and being redirected to a webpage comprising the stripped data. The data recipient 406 may view and/or download the stripped data at the webpage. That data recipient 406 may receive the secure hyperlink in lieu of receiving the communication from the data submitter. The data recipient 406 may receive the secure hyperlink in addition to receiving the communication from the data submitter 402. The data recipient 406 then receives at 426 the communication that was sent by the data submitter 402.

When the data submitter 402 sends the communication to the alias address, the communication is routed directly to the data aggregation server 104 (because the data aggregation server 104 is the communication client for the alias address). The communication sent by the data submitter 402 may include documents, text, video recordings, images, and other structured or unstructured data. The communication capture module 308 strips the data at 420 by analyzing the communication. The communication capture module 308 determines whether a document is attached to the communication. The communication capture module 308 additionally determines whether the body of the communication includes responses to any of the data buckets associated with the particular aggregated data package.

If the communication capture module 308 identifies data within the communication that should be stored in the aggregated data package, then the communication capture module 308 will store that data in a general bucket or a particular data bucket for the aggregated data package. The general bucket receives any structured or unstructured data that has not yet been classified by the data aggregation platform 102, and therefore cannot be routed to the applicable data bucket "question." The data buckets are each associated with a particular "question" and are only filled when the data aggregation server 104 identifies the applicable response to the "question" associated with the data bucket. Thus, the data aggregation server 104 automatically routes structured and unstructured data to the applicable data bucket(s) within the aggregated data package without requiring any intervention from the data submitter 402 and/or the data recipient 406. Additionally, this obviates the need for the data submitter 402 and/or the data recipient 406 to manually input responses and/or upload documents outside their normal communication channels of email, telephone, text message, video conference, fax, and so forth.

The process flow 400 may be particularly implemented when the communication channel is email, but the process flow 400 is not limited to email. The data aggregation server 104 may generate an alias address for other communication channels, and then strip data from those communication channels and route the data to the application aggregated data package.

The communication capture module 308 coordinates with the data bucket module 312 and/or the data analysis algorithm 316 and/or the data translation module 318 to identify data within the communications between the data submitter 402 and the data recipient 406. The communication capture module 308 may route stripped data to an applicable data bucket within the aggregated data package in response to receiving a classification for the data from any of the data bucket module 312, the data analysis algorithm 316, and/or the data translation module 318.

Figure 5:
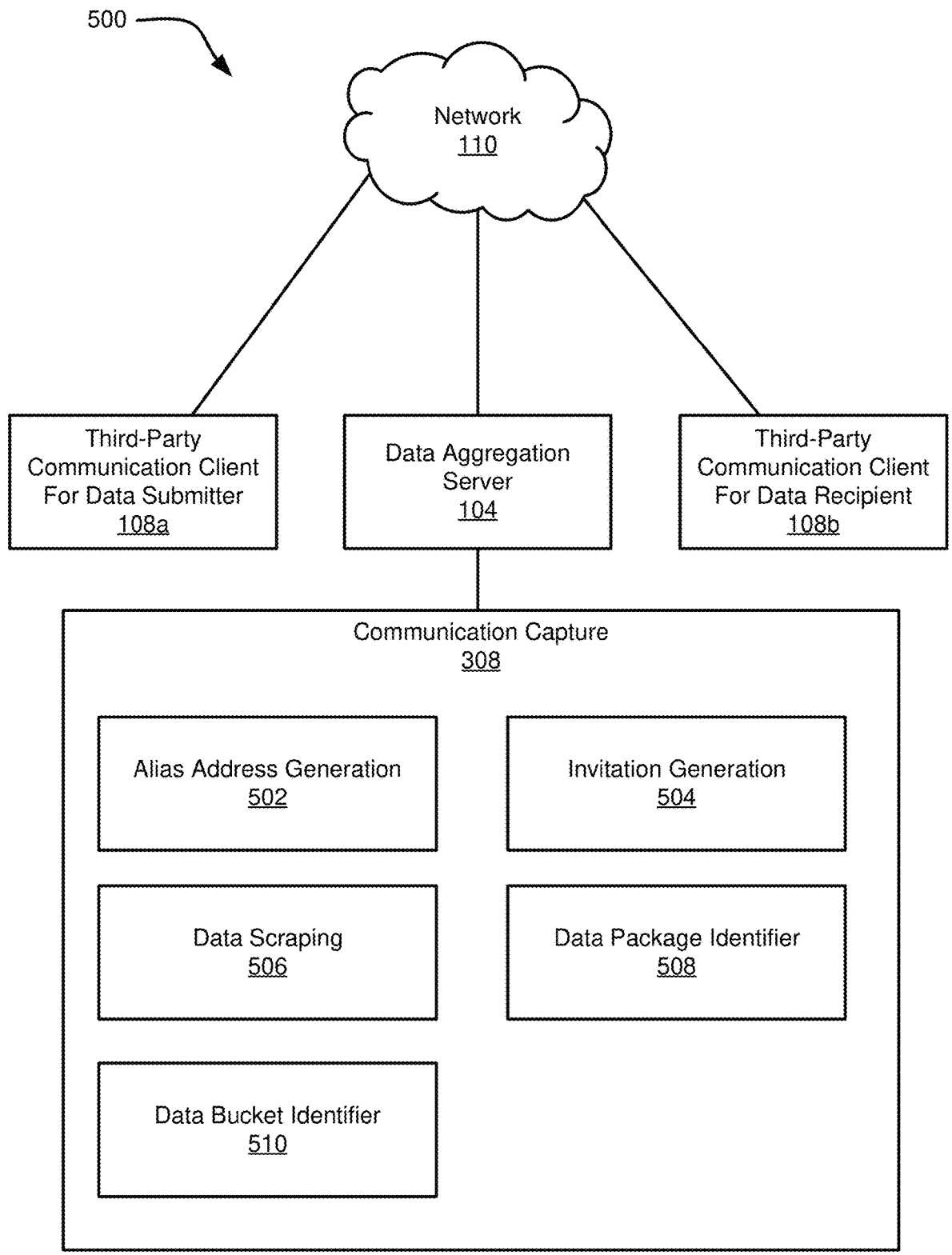
FIG. 5 is a schematic block diagram of a system for retrieving and aggregating data attached to communications between parties.

FIG. 5 is a schematic block diagram of a system 500 for facilitating communications between one or more third-party communication clients 108. The system 500 includes a third-party communication client for a data submitter 108a and a third-party communication client for a data recipient 108b that are each in communication with the network 110. The system 500 further includes the data aggregation server 104 in communication with the network 110. The data aggregation server 104 generates alias addresses for communications between the data submitter and the data recipient. The data submitter may continue to send and receive communications at a personal address serviced by the third-party communication client for the data submitter 108a. Likewise, the data recipient may continue to send and receive communications at a personal address serviced by the third-party communication client for the data recipient 108b.

The communications between the data submitter and the data recipient are "intercepted" and analyzed by the communication capture module 308 of the data aggregation platform 102. The communication capture module 308 further includes modules and components for performing various tasks, including an alias address generation module 502, an invitation generation module 504, a data scraping module 506, a data package identifier module 508, and a data bucket identifier module 510.

The alias address generation module 502 generates a unique alias address for each data submitter and data recipient associated with an aggregated data package. The alias addresses are unique to the person (or entity) associated with the address and are also unique to the applicable aggregated data package. Therefore, if one user is associated with multiple different aggregated data packages that are managed by the data aggregation platform 102, then that user will receive a unique alias address for each of the multiple different aggregated data packages. The alias addresses are managed by the data aggregation server 104 such that any communication sent to or from the alias addresses are received by the data aggregation server 104.

The invitation generation module 504 generates an invitation communication for a data submitter and/or data recipient and transmits the invitation communication to the applicable recipient. The invitation communication may invite a user (i.e., a data submitter or data recipient) to the data aggregation platform 102. The invitation communication may additionally provide the recipient with a means to access a particular aggregated data package on the data aggregation platform by way of a secure link or other means. The invitation communication may provide the recipient with the applicable alias addresses of other users that are also associated with the aggregated data package.

In some cases, the invitation communication requests certain data from the recipient. In these cases, that particular invitation communication is as signed to a data bucket within the aggregated data package. When the recipient responds to the invitation communication, any structured or unstructured data within this response will be analyzed and may be automatically routed to the applicable data bucket.

The data scraping module 506 analyzes communications received by the data aggregation server 104 and scrapes data from those communications. The data scraping module 506 may leverage the data analysis algorithm 316 to identify words or textual characters within the communication, and further to classify the content of the communication. The data scraping module 506 determines whether a document is attached to the communication, and if so, will store that document on the database 112.

The data package identifier module 508 receives a communication and determines which aggregated data package should be associated with that communication. In many cases, the data package identifier module 508 makes this determination based on the recipient address for the communication. That is, if the communication is addressed to an alias address generated by the data aggregation platform 102, then the data package identifier module 508 can perform a lookup on that alias address and determine which aggregated data package is uniquely associated with that alias address.

The data bucket identifier module 510 receives a communication and determines which data bucket within the applicable aggregated data package should be filled with the structured or unstructured data within the communication. The data bucket identifier module 510 may leverage the data analysis algorithm 316, the data bucket module 312, the data partitioning and security module 314, and/or the data translation module 318 to determine whether the data should be stored on the database 112.

Figure 6A:
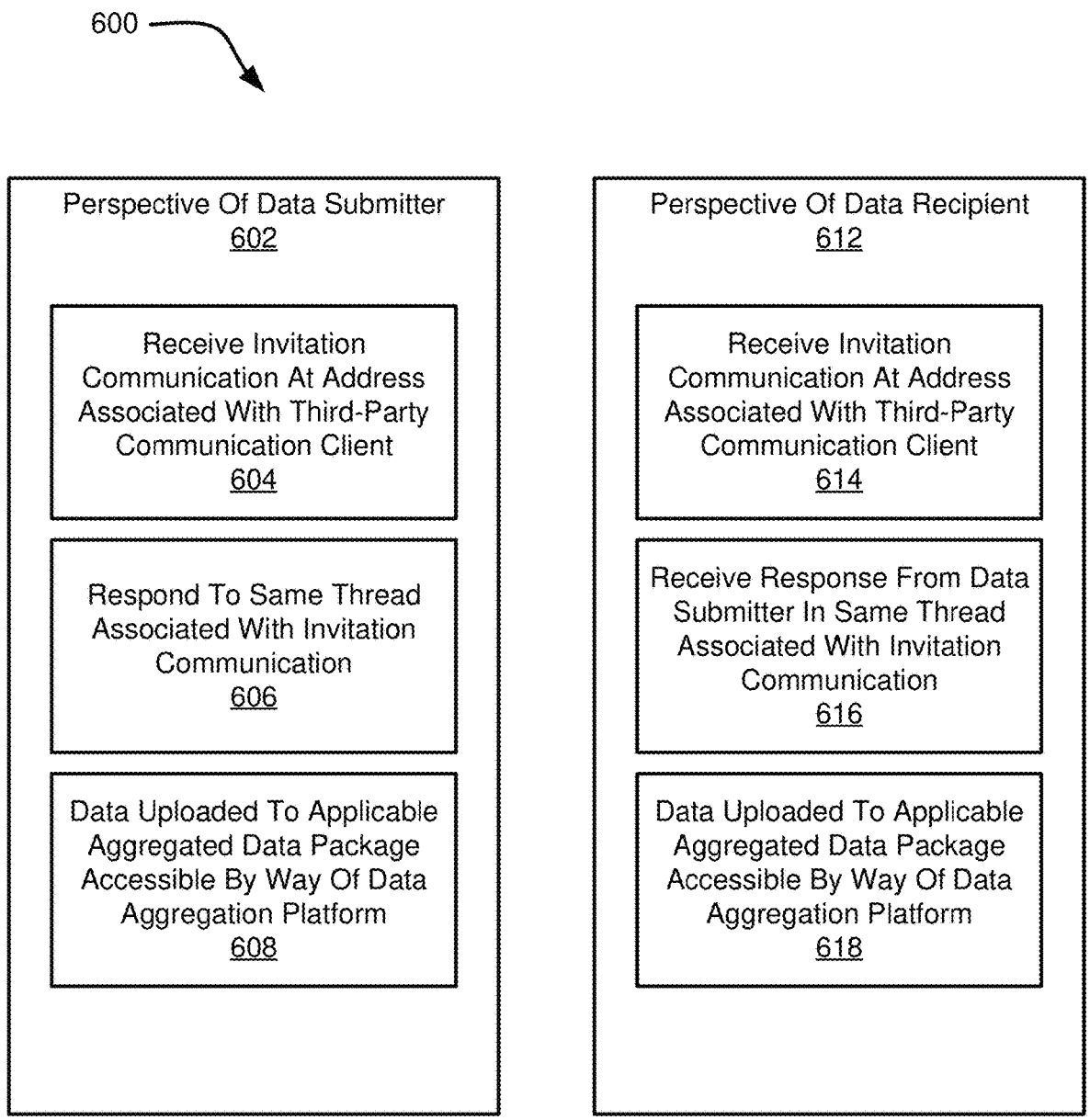
FIG. 6A is a schematic block diagram of a process flow for sending and receiving communications between parties, wherein the communications include structured or unstructured data intended for an aggregated data package.

FIG. 6A is a schematic diagram of a process flow 600 for communications between a data submitter and a data recipient. Block 602 is a schematic diagram of the process flow 600 from the perspective of the data submitter. Block 612 is a schematic diagram of the process flow 600 from the perspective of the data recipient.

From the perspective of the data submitter 602, the data submitter receives at 604 an invitation communication from the data aggregation platform 102. This invitation communication is received at a personal address associated with the data submitter that is serviced by a third-party communication client. The data submitter responds at 606 within the same thread associated with the invitation communication and may attach documents or other data to this response. The structured and/or unstructured data within the response is uploaded at 608 to a data package that is accessible on the data aggregation platform. Alternatively, the data submitter may begin a new communication thread and directly communicate with the alias address associated with the data recipient. The structured or unstructured data within this new communication thread will be uploaded at 608 to the aggregated data package associated with the data recipient's alias address.

In some cases, the invitation communication is generated by the data aggregation platform 102 to seek a response to a certain data bucket within the aggregated data package. For example, the aggregated data package may include a data bucket for "picture ID," and may thus need a scan or image of the data submitter's identification. The data aggregation platform 102 may then send an invitation communication to the data submitter that specifically requests a scan or image of the data submitter's photo identification. The data submitter may then respond to this invitation communication with an attachment. The attachment in that response will then be automatically routed to the applicable data bucket for "picture ID."

From the perspective of the data recipient 612, the data recipient receives at 614 an invitation communication from the data aggregation platform 102. The invitation communication is received at a personal address associated with the data recipient that is serviced by a third-party communication client. The data recipient receives at 616 a response from the data submitter. This response may be received in the same communication thread as the invitation communication. Alternatively, the data recipient may receive a different communication from the data aggregation platform 102 (e.g., text message, email, push notification, web-based notification) indicating that the data submitter has responded and supplied data for the applicable aggregated data package. The data recipient may access at 618 data that has been received from the data submitter and automatically uploaded to the application aggregated data package.

Figure 6B:
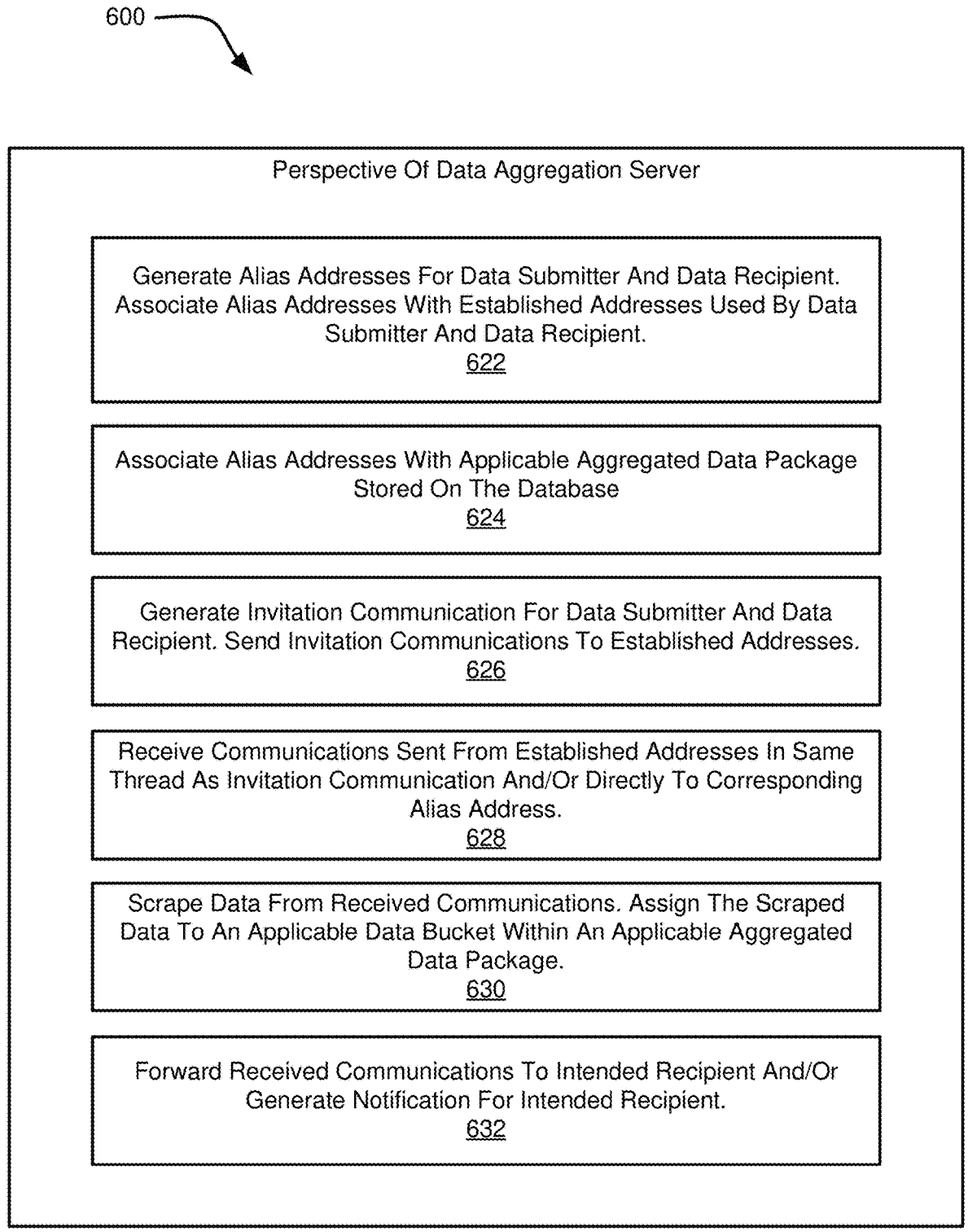
FIG. 6B is a schematic block diagram of a method for retrieving and aggregating data from a communication between parties associated with an aggregated data package.

FIG. 6B is a schematic flow chart diagram of a method 600 for facilitating communications between parties, as seen by the data aggregation server. The method 600 begins and the data aggregation server 104 generates at 622 an alias address for each of a data submitter and a data recipient. The alias addresses are associated with established personal addresses for each of the data submitter and the data recipient. The data aggregation server 104 associates at 624 the alias addresses with an applicable aggregated data package that is stored on the database 112 and managed by the data aggregation platform 102. The data aggregation server 104 generates at 626 an invitation communication for one or more of the data submitter or the data recipient. The data aggregation server 104 sends the invitation communications to the established personal addresses for the data submitter and the data recipient.

The method 600 continues and the data aggregation server 104 receives at 628 communications sent from the established personal addresses of the data submitter and/or the data recipient, when those communications respond to the invitation communication and/or are sent directly to the alias address of the other party. The data aggregation server 104 scrapes at 630 data from the received communications and assigns the scraped data to an applicable data bucket within an applicable aggregated data package. The data aggregation server 104 forwards at 632 the received communications to the intended recipient and/or generates a notification for the intended recipient. The notification may indicate, for example, that the other party sent a communication, the documents or other data from the other party have been stored within the aggregated data package, and so forth.

Figure 7:
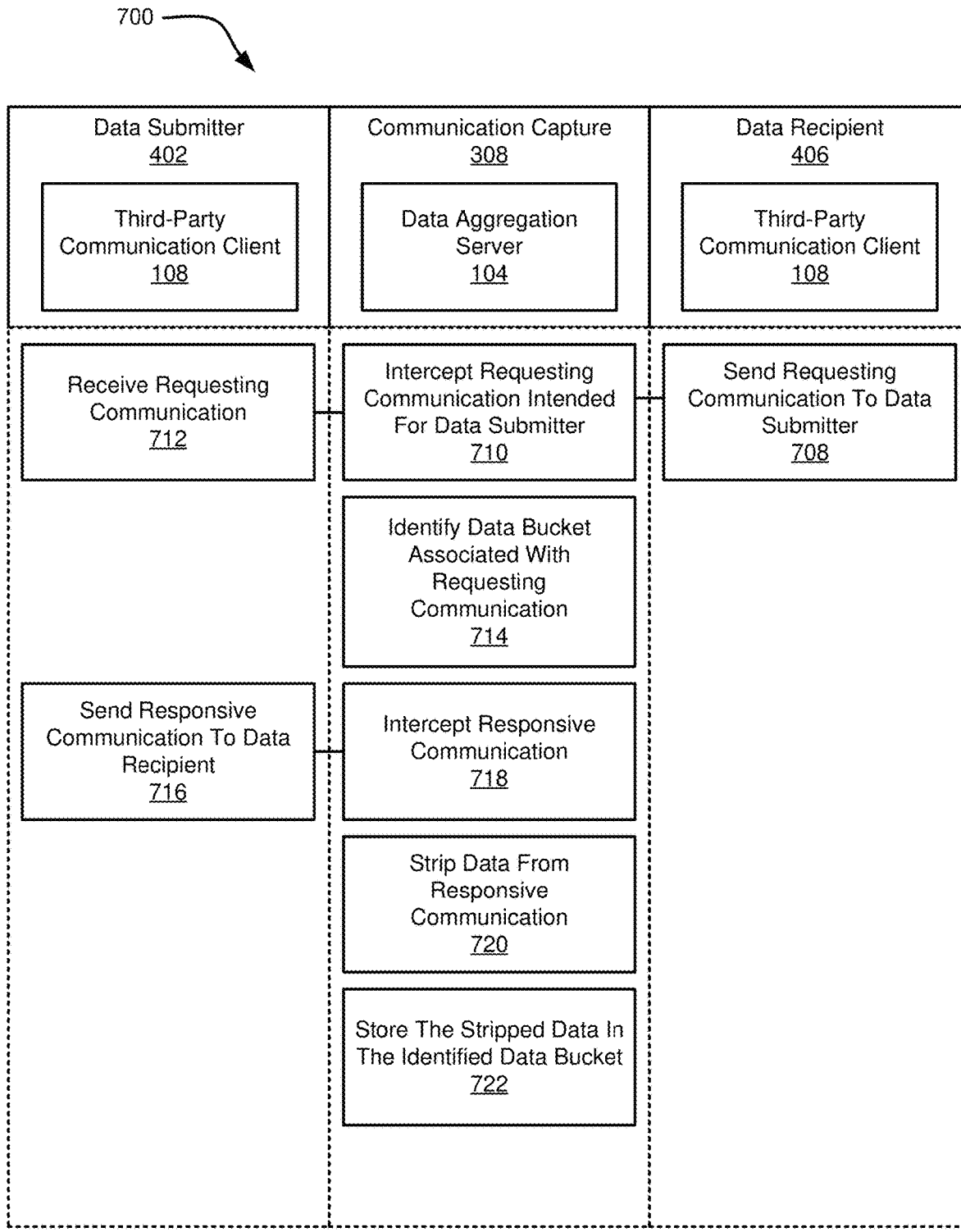
FIG. 7 is a schematic diagram of a process flow for stripping data from two-way electronic communications between a data submitter and a data recipient.

FIG. 7 is a schematic block diagram of a process flow 700 for receiving two-way communications between a data submitter 402 and a data recipient 406. The process flow 700 is performed by a data submitter 402, a data recipient 406, and the communication capture module 308 of the data aggregation server 104. The data submitter 402 and the data recipient 406 may send two-way electronic communications to one another by way of one or more communication channels, including, for example, email communication channels, text message communication channels, social media communication channels, video conference or audio-conferencing communication channels, voice memorandum communication channels, and so forth. The electronic communications sent by the data submitter 402 and the data recipient 406 may be facilitated by third-party communication clients 108, and the data submitter 402 and the data recipient 406 may be using the same or different third-party communication clients 108.

The process flow 700 begins and the data recipient 406 sends at 708 a requesting communication intended for the data submitter 402. The requesting communication is intercepted at 710 by the communication capture module 308. The requesting communication is received at 712 by the data submitter 402. The requesting communication may include a request for one or more documents, text responses, or other data associated with an aggregated data package. The requesting communication may be associated with one or more unique data buckets within an applicable aggregated data package.

The process flow 700 continues and the communication capture module 308 identifies at 714 a data bucket associated with the requesting communication. The requesting communication may be associated with a general data bucket that is intended to receive any documents, files, text responses, or other data that has not yet been classified. The requesting communication many be associated with one or more identified data buckets that are intended to receive a specific document, file, text response, or other data based on the content or file-type of that data.

The process flow 700 continues and the data submitter 402 sends at 716 a responsive communication intended to be received by the data recipient 406. The responsive communication is sent in response to the requesting communication. The responsive communication may be sent in the same communication channel or a different communication channel as the requesting communication. In an example implementation, the requesting communication is an email, and the responsive communication is a reply email to the requesting communication. The communication capture module 308 intercepts at 718 the responsive communication.

The communication capture module 308 strips at 720 data from the responsive communication. The stripped data may include structured data and/or unstructured data. The stripped data may include a header associated with the communication or metadata associated with the communication. The stripped data may include data embedded within the communication, e.g., text within an email, text message, and so forth. The stripped data may include an attachment, such as a document or file attached to an email or other communication.

The communication capture module 308 stores at 722 the stripped data in the identified data bucket. The stripped data may include a plurality of different documents, files, text responses, and other data, and the stripped data may be stored across one or more identified data buckets as needed. All or a portion of the stripped data may be stored in the general data bucket that is intended to receive data that has not yet been classified. The stripped data may be classified based on the requesting communication, i.e., if the requesting communication is associated with an identified data bucket, and the requesting communication is requesting a specific document, file, text response, or other data, then the communication capture module 308 can assume that the responsive communication is responding with the requested document, file, text response, or other data.

The responsive communication may be sent to the data recipient 406. In another implementation, the responsive communication itself is not sent to the data recipient 406, and instead a new notification is generated that informs the data recipient 406 that the responsive communication was received, and the stripped data was stored in the aggregated data package. The communication capture module 308 may store the stripped data on a cloud-based database and generate a secure hyperlink that redirects to a webpage displaying the stripped data. The communication capture module 308 may generate one or more webpages for each aggregated data package and may amend the data stored in connection with each of the one or more webpages. Thus, as the data submitter 402 and the data recipient 406 continue to interact with the data aggregation platform 102, the communication capture module 308 may remove and/or add data to the webpage such that either of the data submitter 402 or the data recipient 406 may click the secure hyperlink to view a current status of all data stored in connection with the aggregated data package. In an implementation, the webpage (and the secure hyperlink) directs a user to a webpage integrated within the data aggregation platform 102 that is rendered by the user interface module 322.

The process flow 700 may be implemented with the use of alias addresses consistent with FIG. 4 and other disclosures herein. In this implementation, the data recipient sends the requesting communication at 708 to an alias address associated with the data submitter 402. The alias address routes to the data aggregation server 104 and the communication capture module 308 "intercepts" the requesting communication because the data aggregation server 104 is the ultimate recipient of the requesting communication. Then the data aggregation server 104 may forward the content of the requesting communication, or generate a new requesting communication, to send to a personal established address associated with the data submitter 402. Thus, when the data submitter 402 receives at 712 the requesting communication, the data submitter 402 is receiving the requesting communication at an established address facilitated by the third-party communication client. Further in this implementation, when the data submitter 402 sends at 716 the responsive communication to the data recipient, the responsive communication is addressed to an alias address associated with the data recipient 406. This alias addresses are managed by the data aggregation server 104. Thus, when the communication capture module 308 "intercepts" the responsive communication at 718, the data aggregation server 104 is receiving the responsive communication because it is addressed to an alias address facilitated by the data aggregation server 104. The data aggregation server 104 may forward the responsive communication, or a newly generated version of responsive communication, to a personal established address associated with the data recipient 406 that is facilitated by the third-party communication client 108.

In an example use-case, the requesting communication is assigned to a "tax return" data bucket on the aggregated data package that is intended to be filled with one or more documents comprising a tax return. The requesting communication is addressed to the data submitter 402 and may reference the aggregated data package (which in this case may be a loan application or other data package that includes a tax return). The data submitter 402 replies to the requesting communication and attaches one or more tax return documents to the responsive communication. The communication capture module 308 strips the one or more tax return documents from the responsive communication and stores them in the "tax return" data bucket on the aggregated data package.

Figure 8A:
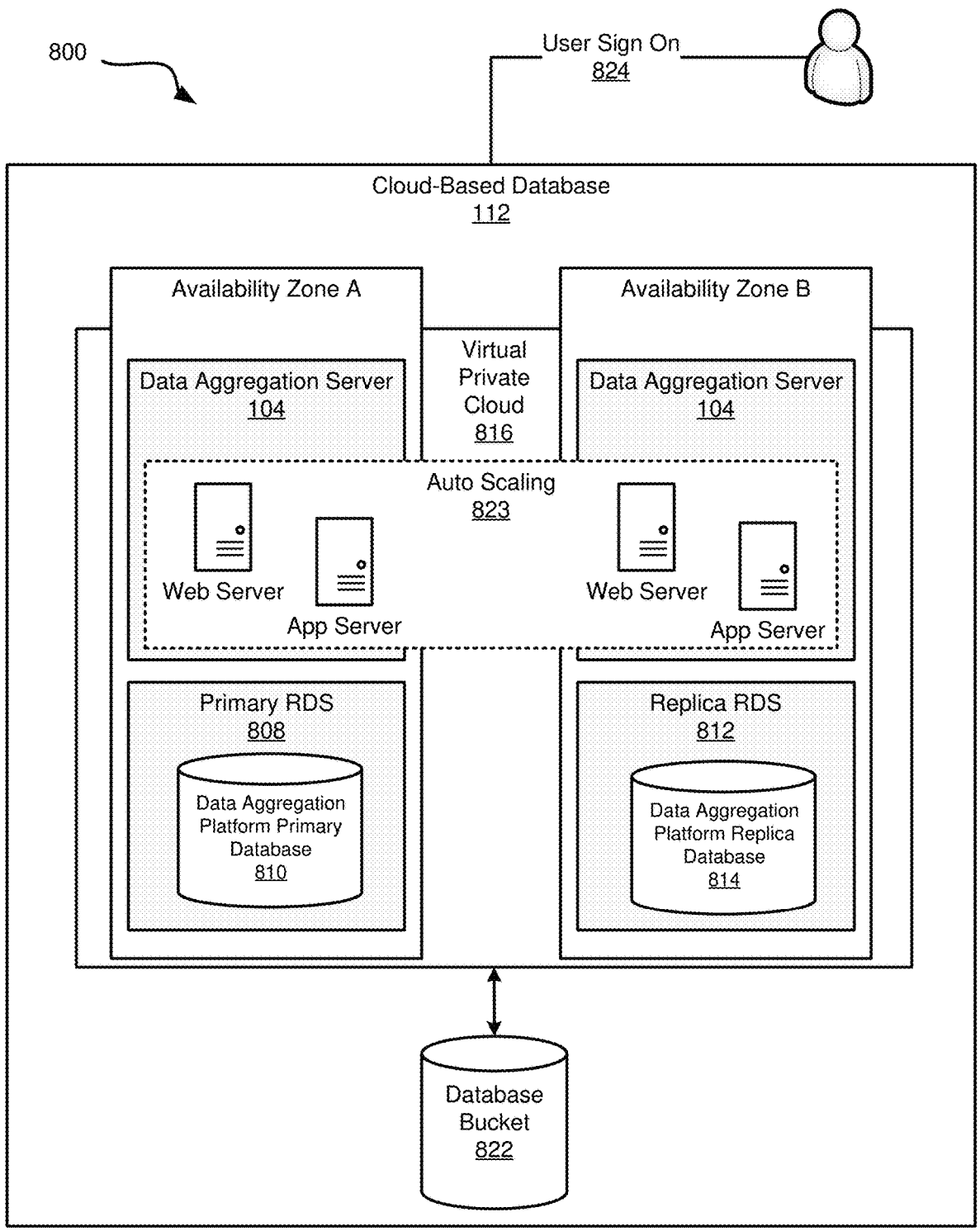
FIG. 8A is a schematic diagram of a system for data storage and analysis on a cloud-based storage system with fault-tolerant servers.

FIG. 8A is a schematic block diagram of a system 800 for data management and security. The system 800 illustrated in FIG. 8A may be implemented in conjunction with the system 100 illustrated in FIG. 1. The system 800 includes a cloud-based database 112 supporting the data aggregation server 104. The cloud-based database 112 includes an Availability Zone A and an Availability Zone B. The Availability Zone A includes a first instance of the data aggregation server 104 and the Availability Zone B includes another instance of the data aggregation server 104. Each of the instances of the data aggregation server 104 includes a web server and an app server, and the cloud-based database 112 auto-scales the processing and storage resources between the web servers and app servers for the Availability Zone A and the Availability Zone B. The Availability Zone A includes a primary relational database service (RDS) 808 and the Availability Zone B includes a replica relational database service 812. The data aggregation platform primary database 810 is stored on the primary relational database service 808 and the data aggregation platform replica database 814 is stored on the replica relational database service 812. The virtual private cloud 816 of the cloud-based database 112 communicates with outside parties by way of Application Program Interfaces 618 and Secure File Transfer Protocol (SFTP) 620 messaging. The cloud-based database 112 includes a database bucket 822 for storing information associated with the data aggregation platform 102. Users interacting the data aggregation platform 102 can sign on 824 to the service by communicating with the cloud-based database 112.

The cloud-based database 112 includes processing and storage resources in communication with the network 120. The cloud-based database 112 includes a resource manager for managing the usage of processing and storage resources. The resource manager of the cloud-based database 112 performs auto scaling 826 load balancing to ensure adequate processing and storage resources are available on demand based on real-time usage.

The availability zones represent discrete datacenters with redundant power, networking, and connectivity for supporting the data aggregation server 104. The availability zones enable the ability to operate production applications and databases in a more highly available, fault tolerant, and scalable way than would be possible with a single datacenter. The Availability Zone A and Availability Zone B are interconnected with high-bandwidth, low-latency networking, over fully redundant, dedicated metro fiber providing high-throughput, low-latency networking between the availability zones. All traffic between the availability zones is encrypted. The network performance of the availability zones is sufficient to accomplish synchronous replication between the availability zones. Applications, modules, components, and processing methods can be partitioned between the availability zones of the cloud-based database 112. When applications are partitioned across the availability zones, the data aggregation server 104 operates with increased protection and isolation from outages that may be caused by a low in power, hardware issues, software issues, and so forth. The availability zones are physically separated by a meaningful geographic distance to ensure the hardware supporting the availability zones will not be impacted by the same outside forces, such as power outages, natural disasters, and so forth.

The virtual private cloud 816 is an on-demand configurable pool of shared resources allocated within the cloud-based database 112. The virtual private cloud 816 provides isolation between different users communicating with the cloud-based database 112, e.g., different facilities, user accounts, and clients in communication with the data aggregation platform 102. The isolation between one virtual private cloud 816 user and all other users of the same cloud is achieved through allocation of a private IP subnet and a virtual communication construction such as a VLAN or a set of encrypted communication channels per user. The virtual private cloud 816 provides isolation between users within the cloud-based database 112 and is accompanied with a VPN function allocated per-user within the virtual private cloud 816. This secures the remote access to the data aggregation platform 102 by way of authentication and encryption. The data aggregation platform 102 is then essential run on a "virtually private" cloud, even if the processing and storage resources are provided by a third-party cloud-based database service, such as Amazon Web Services®.

The auto-scaling 826 is performed by a resource manager of the cloud-based database 112. The resource manager distributes workload between the web servers and the app servers of the various availability zones of the cloud-based database 112. In some cases, one client of the data aggregation platform 102 may consume a large quantity of storage resources and processing resources at a certain time, and the resource manager will allocate different web servers and app servers across the availability zones to ensure the client receives an adequate quantity of storage and processing resources. The auto-scaling 826 is performed in real-time to meet the needs of the data aggregation platform 102.

The primary and secondary relational database services 808, 812 provide a means to access, replicate, query, and write to the data aggregation platform database instances 810, 814. The data aggregation platform primary database 810 may include a copy of data associated with the data aggregation platform 102, such as user login information, user preference data, pharmaceutical inventory data, past purchasing data, current pricing data, pharmaceutical catalogue data, and so forth. The data aggregation platform replica database 814 may include a replica copy of all or some of the data stored on the data aggregation platform primary database 810. The replicated databases provide fault-tolerance and protect the data aggregation platform 102 form becoming inoperative during a power outage, hardware outage, or natural disaster.

The database bucket 822 provides object storage through a web service interface. The database bucket 822 uses scalable storage infrastructure that can be employed to store any type of object. The database bucket 822 may store applications, software code, backup and recovery, disaster recovery, data archives, data lakes for analytics, and hybrid cloud storage to support the data aggregation platform 102.

Figure 8B:
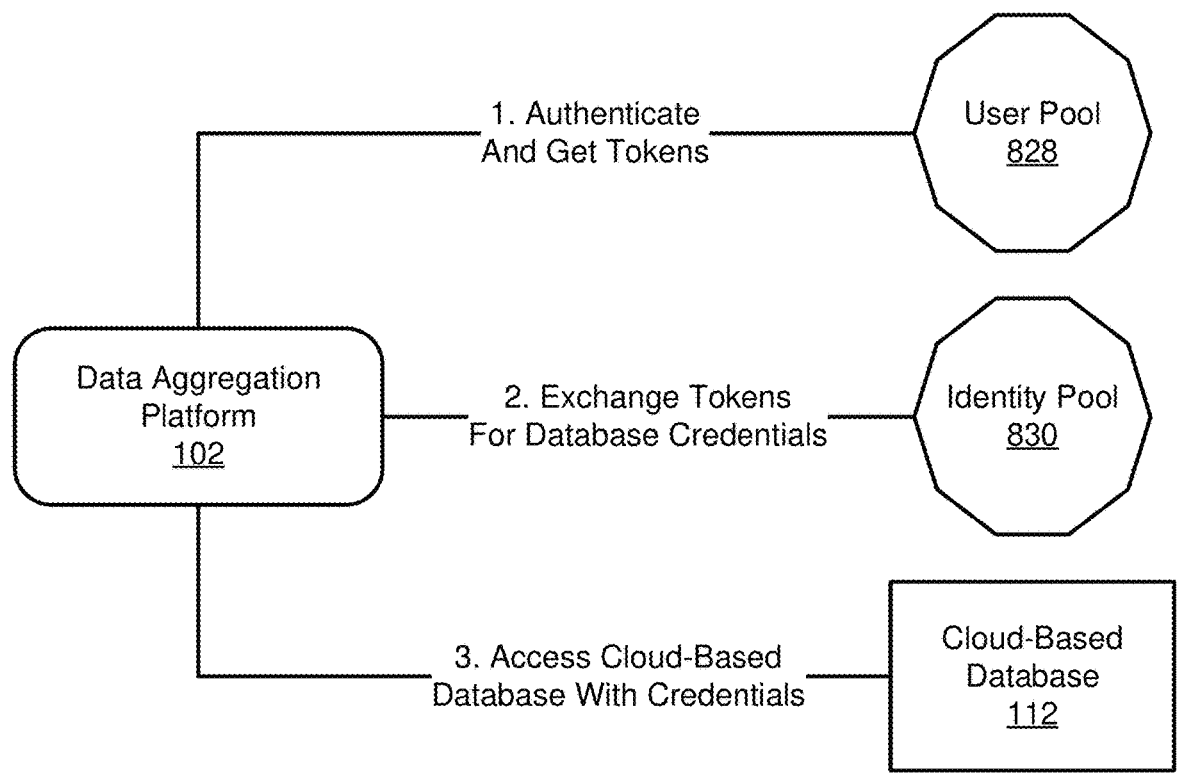
FIG. 8B is a schematic block diagram of a system and process flow for accessing a cloud-based database.

FIG. 8B is a schematic block diagram of a system and process flow for accessing the cloud-based database 112 described in FIG. 8A. The data aggregation platform 102 first authenticates and retrieves tokens from a user pool 828. The data aggregation platform 102 then exchanges tokens for database credentials with the identity pool 830. The data aggregation platform 102 is then granted access to the could-based database 112 based upon the credentials.

The user pool 828 is a user directory associated with the cloud-based database 112. With the user pool 828, users can sign into the data aggregation platform 102 through a mobile application, computer-based application, web-based user interface, third-party identity provider, and so forth. Whether users sign in directly or through a third party, all members of the user pool 828 have a director profile that can be accessed. The user pool 828 enables sign-up and sign-in services for the data aggregation platform 102 and further enables social sign-in with outside services, including outside social media networks. The user pool 828 stores a directory, and this directory may be managed, and permissions may be assigned to users within the director.

The identity pool 830 creates temporary credentials to access the cloud-based database 112. The identity pool 830 supports anonymous guest users and social sign-in through outside parties, including third-party social media network.

The system 800 authenticates users by leveraging the user pool 828. After a successful sign-in through the user pool 828, the data aggregation platform 102 creates user pool groups to manage permissions and to represent different types of users. The data aggregation platform 102 creates user groups defined by a type of data permission for that group.

In an example implementation, the data aggregation platform 102 is implemented for managing application processes, for example, data packages for commercial lending, real property lending, data packages for educational admissions, and so forth. In this implementation, the user groups are defined based on that user's role within the data package. For example, one user group may comprise lender user accounts, and the user accounts within that user group will have special permissions to read and write to data associated with the lender and/or data that the lender needs to access. Further for example, a user group may comprise teammate user accounts, and the user accounts with that user groups will have permissions to read and write data necessary for the teammate to assist another user. In this example, the teammate may include, for example, an accountant, real estate agent, lawyer, and so forth that is assigned to a specific user within the data package. This teammate may only be allowed to view and alter certain documents that are specific to the assigned person, and specific to the teammate's designated role. The data permissions within the data aggregation platform 102 are assigned at least based on which user group the user belongs to, e.g., whether the user is designated as a lender, principal, primary contact, teammate, and so forth.

The data aggregation platform 102 may access the cloud-based database 112 through an Application Program Interface (API) Gateway. The API Gateway validates the tokens from a successful user pool 828 authentication and uses those tokens to grant users access to the resources within the data aggregation platform 102 and the cloud-based database 112. The data aggregation platform 102 leverages the user groups defined within the user pool 828 to control permissions with the API Gateway by mapping group membership to roles within the user pool 828. The user groups that a user is a member of are included in the identification token provided by a user pool 828 when the user signs into the data aggregation platform 102. The data aggregation platform 102 submits the user pool tokens with a request to the API Gateway for verification by an authorizer for the cloud-based database 112.

In an embodiment, a unique user pool 828 is created for each tenant within the data aggregation platform 102. In an example implementation, a tenant includes a unique bank or lending institution. This approach provides maximum isolation for each tenant and allows the data aggregation platform 102 to implement different configurations for each tenant. Tenant isolation by user pool 828 allows flexibility in user-to-tenant mapping and allows multiple profiles for the same user. Additionally, in this implementation, a unique hosted user interface may be assigned to each tenant independently, and the data aggregation platform 102 will automatically redirect each tenant to their tenant-specific user interface instance.

In an embodiment, a single user may be mapped to multiple tenants without recreating the user's profile within the data aggregation platform 102. In an example implementation, this may be useful when, for example, a single borrower is associated with data packages at multiple different banks or lending institutions, a single "teammate" (e.g., accountant, lawyer, real estate agent, and so forth) is associated with data packages at multiple different banks or lending institutions, and so forth. In this embodiment, a data package client is executed for each tenant, and this data package client enables the tenant external IdP as the only allowed provider for that data package client. Data package client-based multi-tenancy requires additional considerations for username, password, and more to authenticate users with the native accounts. When the hosted user interface is in use, a session cookie is created to maintain the session for the authenticated user. The session cookie also provides SSO between data package clients in the same user pool 828.

In an embodiment, the data aggregation platform 102 implements role-based access control. The identity pools 830 assign authenticated users a set of temporary, limited-privilege credentials to access the resources in the cloud-based database 112. The permissions for each user are controlled through roles created within the data aggregation platform 102. The data aggregation platform 102 defines rules to choose the role for each user based on claims in the user's identification token. The rules enable the data aggregation platform 102 to map claims from an identity provider token to a role. Each rule specifies a token claim (such as a user attribute in the identification token from the user pool 828), match type, a value, and a role. The match type can be Equals, NotEqual, StartsWith, or Contains. If a user has a matching value for the claim, the user can assume that role when the user gets credentials. For example, the data aggregation platform 102 may create a rule that assigns a specific role for the users with a custom:dept custom attribute value of Sales.

Rules are evaluated in order, and the role for the first matching rule is used, unless a custom role is specified to override the order. The data aggregation platform 102 may set multiple rules for an authentication provider in the identity pool 830. Rules are applied in order. The order of the rules may be altered. The first matching rule takes precedence. If the match type is NotEqual, and the claim does not exist, then the rule is not evaluated. If no rules match, the role resolution setting is applied to either use the default authenticated role or to deny. The data aggregation platform 102 specifies a role within the API connection to the cloud-based database 112 to be assigned when no rules match in the ambiguous role resolution process. For each user pool 828 or other authentication provider configured for an identity pool 830, the data aggregation platform 102 may assign numerous rules.

Figure 9:
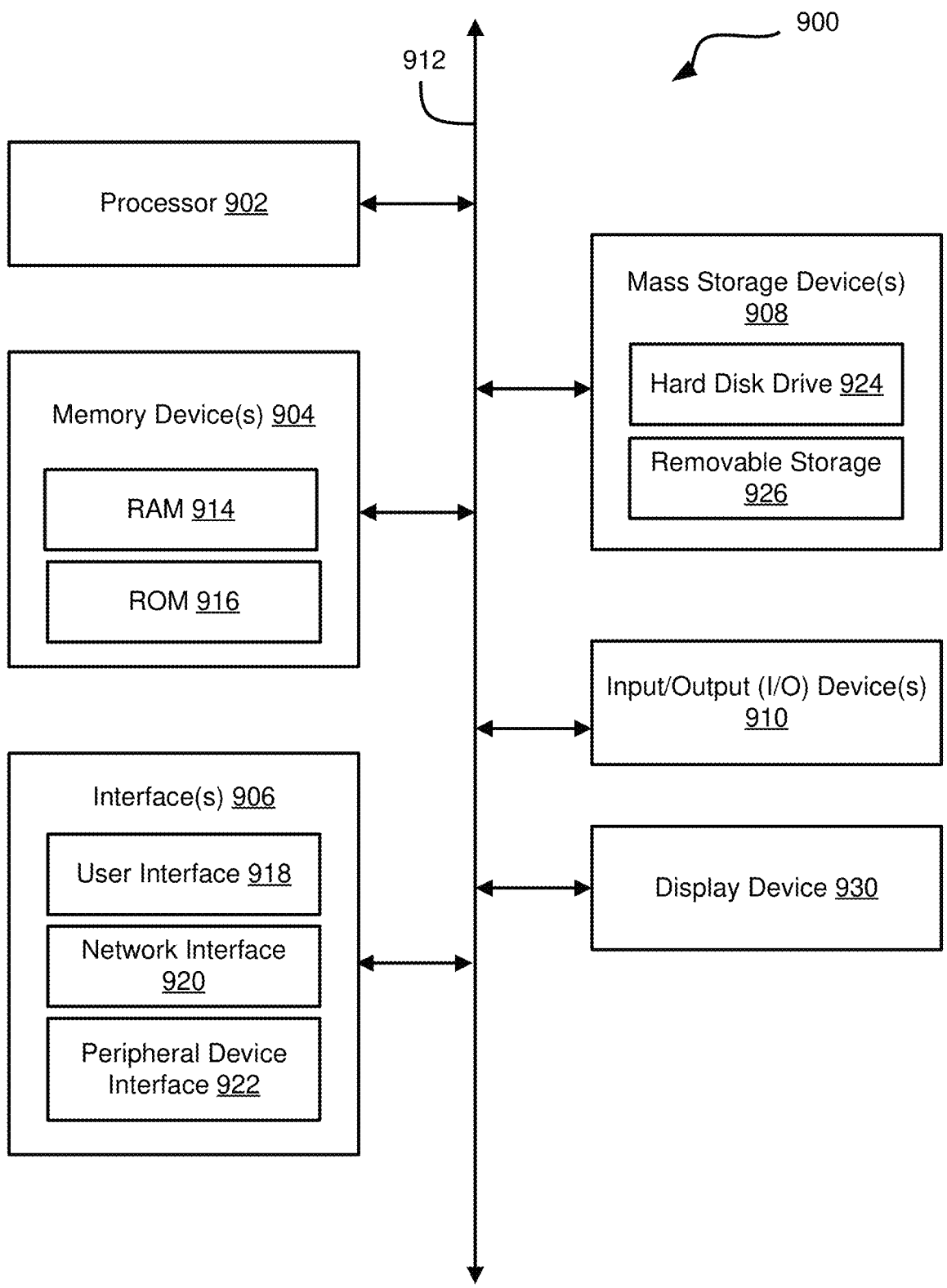
FIG. 9 is a schematic diagram illustrating components of an example computing device.

Referring now to FIG. 9, a block diagram of an example computing device 900 is illustrated. Computing device 900 may be used to perform various procedures, such as those discussed herein. Computing device 900 can perform various monitoring functions as discussed herein, and can execute one or more application programs, such as the application programs or functionality described herein. Computing device 900 can be any of a wide variety of computing devices, such as a desktop computer, in-dash computer, vehicle control system, a notebook computer, a server computer, a handheld computer, tablet computer and the like.

Computing device 900 includes one or more processor(s) 904, one or more memory device(s) 904, one or more interface(s) 906, one or more mass storage device(s) 908, one or more Input/output (I/O) device(s) 910, and a display device 930 all of which are coupled to a bus 912. Processor(s) 904 include one or more processors or controllers that execute instructions stored in memory device(s) 904 and/or mass storage device(s) 908. Processor(s) 904 may also include various types of computer-readable media, such as cache memory.

Memory device(s) 904 include various computer-readable media, such as volatile memory (e.g., random access memory (RAM) 914) and/or nonvolatile memory (e.g., read-only memory (ROM) 916). Memory device(s) 904 may also include rewritable ROM, such as Flash memory.

Mass storage device(s) 908 include various computer readable media, such as magnetic tapes, magnetic disks, optical disks, solid-state memory (e.g., Flash memory), and so forth. As shown in FIG. 9, a particular mass storage device 908 is a hard disk drive 924. Various drives may also be included in mass storage device(s) 908 to enable reading from and/or writing to the various computer readable media. Mass storage device(s) 908 include removable media 926 and/or non-removable media.

I/O device(s) 910 include various devices that allow data and/or other information to be input to or retrieved from computing device 900. Example I/O device(s) 910 include cursor control devices, keyboards, keypads, microphones, monitors or other display devices, speakers, printers, network interface cards, modems, and the like.

Display device 930 includes any type of device capable of displaying information to one or more users of computing device 900. Examples of display device 930 include a monitor, display terminal, video projection device, and the like.

Interface(s) 906 include various interfaces that allow computing device 900 to interact with other systems, devices, or computing environments. Example interface(s) 906 may include any number of different network interfaces 920, such as interfaces to local area networks (LANs), wide area networks (WANs), wireless networks, and the Internet. Other interface(s) include user interface 918 and peripheral device interface 922. The interface(s) 906 may also include one or more user interface elements 918. The interface(s) 906 may also include one or more peripheral interfaces such as interfaces for printers, pointing devices (mice, track pad, or any suitable user interface now known to those of ordinary skill in the field, or later discovered), keyboards, and the like.

Bus 912 allows processor(s) 904, memory device(s) 904, interface(s) 906, mass storage device(s) 908, and I/O device(s) 910 to communicate with one another, as well as other devices or components coupled to bus 912. Bus 912 represents one or more of several types of bus structures, such as a system bus, PCI bus, IEEE bus, USB bus, and so forth.

For purposes of illustration, programs and other executable program components are shown herein as discrete blocks, such as block 302 for example, although it is understood that such programs and components may reside at various times in different storage components of computing device 900 and are executed by processor(s) 902.

Alternatively, the systems and procedures described herein, including programs or other executable program components, can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method. The method includes receiving a requesting electronic communication sent from a data recipient to a data submitter, wherein the requesting electronic communication comprises a request for data to be assigned to an identified data bucket within an aggregated data package. The method includes receiving a responsive electronic communication sent from the data submitter to the data recipient. The method includes stripping data from the responsive electronic communication and storing the stripped data in the identified data bucket within the aggregated data package.

Example 2 is a method as in Example 1, wherein the stripped data comprises structured data comprising a text response.

Example 3 is a method as in any of Examples 1-2, wherein the stripped data comprises unstructured data comprising one or more of a document, file, image, audio recording, or video recording.

Example 4 is a method as in any of Examples 1-3, wherein one or more of the requesting electronic communication or the responsive electronic communication is an email.

Example 5 is a method as in any of Examples 1-4, wherein one or more of the requesting electronic communication or the responsive electronic communication is a voice message.

Example 6 is a method as in any of Examples 1-5, further comprising intercepting two-way communications between the data recipient and the data submitter.

Example 7 is a method as in any of Examples 1-6, wherein one or more of the data recipient or the data submitter sends a communication from a third-party communication client, and wherein intercepting the two-way communications between the data recipient and the data submitter comprises receiving the two-way communications at a server in communication with the third-party communication client.

Example 8 is a method as in any of Examples 1-7, wherein the identified data bucket is a file structure stored on a database with a parent-child relationship such that the data bucket comprises a parent data designation and the stripped data stored in the identified data bucket comprises a child data designation.

Example 9 is a method as in any of Examples 1-8, wherein the aggregated data package comprises a plurality of data buckets, and wherein each of the plurality of data buckets comprises metadata indicating a type of data or content of data to be stored in that data bucket.

Example 10 is a method as in any of Examples 1-9, further comprising determining whether the aggregated data package is complete based on whether all required data buckets of the plurality of data buckets has been filled with one or more of structured data or unstructured data.

Example 11 is a method as in any of Examples 1-10, further comprising, in response to determining the aggregated data package is complete, generating a notification for one or more of the data submitter or the data recipient indicating that the aggregated data package is complete.

Example 12 is a method as in any of Examples 1-11, further comprising: generating one or more requesting communications for each of the plurality of data buckets that has not been filled; and transmitting each of the one or more requesting communications to the data submitter; wherein the one or more requesting communications comprises a request for certain data to be stored in a corresponding data bucket within the aggregated data package.

Example 13 is a method as in any of Examples 1-12, further comprising: receiving a response from the data submitter to one of the one or more requesting communications that is assigned to one data bucket of the plurality of data buckets that has not been filled; stripping structured or unstructured data from the response; and storing the stripped structured or unstructured data in the assigned data bucket of the plurality of data buckets that has not been filled.

Example 14 is a method as in any of Examples 1-13, further comprises executing a data analysis algorithm to classify content of one or more of the requesting electronic communication or the responsive electronic communication.

Example 15 is a method as in any of Examples 1-14, further comprising: intercepting a plurality of communications between the data recipient and the data submitter; stripping attachments from the plurality of communications; and storing the stripped attachments within the aggregated data package.

Example 16 is a method as in any of Examples 1-15, wherein storing the stripped attachments within the aggregated data package comprises assigning one or more of the stripped attachments to a general data bucket associated with the aggregated data package, wherein the general data bucket stores data that has not yet been assigned to a unique data bucket within the aggregated data package.

Example 17 is a method as in any of Examples 1-16, further comprising generating an alias address for the data recipient, wherein the alias address is associated with the aggregated data package.

Example 18 is a method as in any of Examples 1-17, wherein receiving the responsive electronic communication sent from the data submitter to the data recipient comprises receiving the responsive electronic communication at the alias address associated with the aggregated data package.

Example 19 is a method as in any of Examples 1-18, wherein the alias address is one or more of an alias email address or an alias phone number.

Example 20 is a method as in any of Examples 1-19, wherein the aggregated data package is a collection of structured data and/or unstructured data, and wherein the data recipient receives the data stored in the aggregated data package, and wherein a data submitter provides data stored in the aggregated data package.

Example 21 is a method as in any of Examples 1-20, wherein stripping the data from the responsive electronic communication comprises determining whether the responsive electronic communication comprises an attachment.

Example 22 is a method as in any of Examples 1-21, wherein the responsive electronic communication comprises the attachment, and wherein the attachment comprises one or more of a text file, a document, an image, a voice recording, or a video recording.

Example 23 is a method as in any of Examples 1-22, wherein storing the stripped data in the identified data bucket comprises storing the stripped data on a database and generating metadata that associates the stripped data with the identified data bucket.

While various embodiments of the present disclosure have been described above, it should be understood they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the disclosure to the precise form disclosed. Many modifications and variations are possible considering the above teaching. Further, it should be noted that any or all the alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
   receiving a requesting electronic communication sent from a data recipient to a data submitter, wherein the requesting electronic communication comprises a request for responsive data;
   identifying an aggregated data package associated with the data recipient;
   identifying a data bucket of the aggregated data package to receive the responsive data, wherein the data bucket is assigned to receive a certain type or content of data;
   receiving a responsive electronic communication sent from the data submitter to the data recipient, wherein the responsive electronic communication comprises the responsive data;
   stripping the responsive data from the responsive electronic communication;
   storing the responsive data on a database comprising the aggregated data package; and
   associating the stripped responsive data with the identified data bucket of the aggregated data package;
   wherein the identified data bucket is a file structure stored on the database with a parent-child relationship such that the identified data bucket comprises a parent data designation and the stripped responsive data associated with the identified data bucket comprises a child data designation.

2. The method of claim 1, wherein the stripped responsive data comprises structured data comprising a text response.

3. The method of claim 1, wherein the stripped responsive data comprises unstructured data comprising one or more of a document, file, image, audio recording, or video recording.

4. The method of claim 1, wherein one or more of the requesting electronic communication or the responsive electronic communication is an email.

5. The method of claim 1, wherein one or more of the requesting electronic communication or the responsive electronic communication is a voice message.

6. The method of claim 1, further comprising intercepting two-way communications between the data recipient and the data submitter, and wherein:
   one or more of the data recipient or the data submitter sends a communication from a third-party communication client; and
   intercepting the two-way communications between the data recipient and the data submitter comprises receiving the two-way communications at a server in communication with the third-party communication client.

7. The method of claim 1, wherein the aggregated data package comprises a plurality of data buckets, and wherein each of the plurality of data buckets comprises metadata indicating a type of data or content of data to be stored in that data bucket.

8. The method of claim 7, further comprising determining whether the aggregated data package is complete based on whether all required data buckets of the plurality of data buckets has been filled with one or more of structured data or unstructured data.

9. The method of claim 8, further comprising, in response to determining the aggregated data package is complete, generating a notification for one or more of the data submitter or the data recipient indicating the aggregated data package is complete.

10. The method of claim 8, further comprising:
    generating one or more requesting communications for each of the plurality of data buckets that has not been filled; and
    transmitting each of the one or more requesting communications to the data submitter;
    wherein the one or more requesting communications comprises a request for certain data to be stored in a corresponding data bucket within the aggregated data package.

11. The method of claim 10, further comprising:
    receiving a new responsive electronic communication from the data submitter, wherein the new responsive electronic communication is a response to one of the one or more requesting communications;
    stripping structured or unstructured data from the new responsive electronic communication; and
    associating the stripped structured or unstructured data with an applicable data bucket of the plurality of data buckets that has not been filled.

12. The method of claim 1, further comprising executing a data analysis algorithm to classify content of one or more of the requesting electronic communication or the responsive electronic communication.

13. The method of claim 1, further comprising:
    receiving a new electronic communication sent from the data submitter to the data recipient;
    stripping an attachment from the new electronic communication; and
    associating the attachment with a general data bucket of the aggregated data package;
    wherein the general data bucket stores data that has not yet been assigned to a unique data bucket within the aggregated data package.

14. The method of claim 1, further comprising generating an alias address for the data recipient, wherein the alias address is associated with the aggregated data package such that data stripped from electronic communications sent to the alias address is stored in association with the aggregated data package.

15. The method of claim 14, wherein receiving the responsive electronic communication sent from the data submitter to the data recipient comprises receiving the responsive electronic communication at the alias address associated with the aggregated data package.

16. The method of claim 15, wherein the alias address is one or more of an alias email address or an alias phone number.

17. The method of claim 1, wherein stripping the data from the responsive electronic communication comprises one or more of:
  identifying an attachment to the responsive electronic communication and stripping the attachment from the responsive electronic communication; or
  identifying a textual response within the responsive electronic communication and stripping the textual response from the responsive electronic communication.

18. The method of claim 17, wherein the responsive electronic communication comprises the attachment, and wherein the attachment comprises one or more of a text file, a document, an image, a voice recording, or a video recording.

19. The method of claim 1, wherein associating the stripped responsive data with the identified data bucket comprises generating metadata that associates the stripped responsive data with the identified data bucket.

* * * * *